(12) United States Patent
Kimura

(10) Patent No.: US 9,587,965 B2
(45) Date of Patent: Mar. 7, 2017

(54) OPTICAL ENCODER AND REFERENCE SIGNAL GENERATION METHOD FOR OPTICAL ENCODER

(71) Applicant: Mitutoyo Corporation, Kawasaki, Kanagawa (JP)

(72) Inventor: Akihide Kimura, Tokorozawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 117 days.

(21) Appl. No.: 14/738,228

(22) Filed: Jun. 12, 2015

(65) Prior Publication Data

US 2015/0362344 A1 Dec. 17, 2015

(30) Foreign Application Priority Data

Jun. 17, 2014 (JP) ................. 2014-124073

(51) Int. Cl.
*G01D 5/34* (2006.01)
*G01D 5/347* (2006.01)
*G01D 5/244* (2006.01)

(52) U.S. Cl.
CPC ....... *G01D 5/34715* (2013.01); *G01D 5/2448* (2013.01)

(58) Field of Classification Search
CPC ................. G01D 5/34715; G01D 5/2448
See application file for complete search history.

(56) References Cited

U.S. PATENT DOCUMENTS 9,347,802 B2 * 5/2016 Horiguchi .............. G01D 5/347

FOREIGN PATENT DOCUMENTS

JP 3358854 10/2002

* cited by examiner

*Primary Examiner* — Tony Ko
(74) *Attorney, Agent, or Firm* — Rankin, Hill & Clark LLP

(57) ABSTRACT

First and second output signals are generated based on amounts of light received by first and second light-receiving elements, respectively, when a detection head is moved along a scale; a first amplitude adjustment is performed to adjust an amplitude of the first or second output signal such that levels of first and second output signals become equal at a first reference phase; a second amplitude adjustment is performed to adjust an amplitude of the first or second output signal such that levels of the first and second output signals become equal at a second reference phase; and a reference signal that starts at a timing when levels of the second output signal and the first output signal subjected to the first amplitude adjustment become equal and ends at a timing when levels of the second output signal and the first output signal subjected to the second amplitude adjustment become equal.

11 Claims, 21 Drawing Sheets

US 9,587,965 B2

OPTICAL ENCODER AND REFERENCE SIGNAL GENERATION METHOD FOR OPTICAL ENCODER

INCORPORATION BY REFERENCE

This application is based upon and claims the benefit of priority from Japanese patent application No. 2014-124073, filed on Jun. 17, 2014, the disclosure of which is incorporated herein in its entirety by reference.

BACKGROUND OF THE INVENTION

1. Field of the Invention

The present invention relates to an optical encoder and a reference signal generation method for the optical encoder.

2. Description of Related Art

Optical encoders that detect a position of a detection head with respect to a scale are widely used to detect a position of a measurement device and the like. A scale of an incremental encoder is provided with a displacement detection pattern for detecting a relative position of the detection head with respect to the scale, and a reference point detection pattern for detecting a reference position. The incremental encoder is capable of converting relative position information detected from the displacement detection pattern into absolute position information based on the reference position detected from the reference point detection pattern. Therefore, it is required that the incremental encoder detect a reference position with high accuracy.

Japanese Patent No. 3358854 discloses an optical rotary encoder having a configuration in which a first light-receiving element and a second light-receiving element are arranged in parallel in a movement direction of a scale. As shown in FIG. 21, the rotary encoder disclosed in Japanese Patent No. 3358854 generates a reference signal based on a first output signal V11 output from the first light-receiving element, a second output signal V12 output from the second light-receiving element, a third output signal V13 generated by reducing the amplitude of the first output signal V11, and a fourth output signal V14 generated by reducing the amplitude of the second output signal V12.

In the rotary encoder disclosed in Japanese Patent No. 3358854, a cross-point between the second output signal V12 and the third output signal V13 is used as a starting point of the reference signal and a cross-point between the first output signal V11 and the fourth output signal V14 is used as an end point of the reference signal. The width and timing of the generated reference signal can be adjusted by adjusting an amplification factor when the first output signal V11 and the second output signal V12 are input to a signal processing circuit.

SUMMARY OF THE INVENTION

Japanese Patent No. 3358854 discloses a technique for adjusting the width and timing of the reference signal. It is desirable to generate a reference signal with a constant width and timing with respect to a certain reference every time the width and timing of the reference signal are adjusted. However, Japanese Patent No. 3358854 fails to disclose a technique for generating a reference signal with such a constant width and timing every time the width and timing of the reference signal are adjusted.

The present invention has been made in view of the above-mentioned circumstances, and an object of the present invention is to stably provide a reference signal with a constant width and timing.

A first exemplary aspect of the present invention is a reference signal generation method for an optical encoder, the optical encoder including: a scale including a reference point detection pattern and a displacement detection pattern; and a detection head including: a light source that emits light to the scale; a first light-receiving element and a second light-receiving element which receive light emitted from the reference point detection pattern when light is irradiated on the reference point detection pattern by the light source, the first light-receiving element and the second light-receiving element being arranged in parallel in a length measuring direction of the scale; and a main signal detection unit that detects a main signal from light transmitted through the displacement detection pattern, the reference signal generation method including: generating a first output signal based on an amount of light received by the first light-receiving element when the detection head is moved along the scale; generating a second output signal based on an amount of light received by the second light-receiving element when the detection head is moved along the scale; performing a first amplitude adjustment to adjust an amplitude of one of the first output signal and the second output signal in such a manner that a level of the first output signal and a level of the second output signal become equal when a phase of the main signal is a first reference phase; performing a second amplitude adjustment to adjust an amplitude of one of the first output signal and the second output signal in such a manner that the level of the first output signal and the level of the second output signal become equal when the phase of the main signal is a second reference phase; and outputting a reference signal that starts at a timing when the level of the second output signal and the level of the first output signal subjected to the first amplitude adjustment become equal and ends at a timing when the level of the second output signal and the level of the first output signal subjected to the second amplitude adjustment become equal.

According to the first exemplary aspect of the present invention, it is preferable to generate, in the first amplitude adjustment, a third output signal by adjusting an amplitude of the first output signal in such a manner that the level of the first output signal and the level of the second output signal become equal when the phase of the main signal is the first reference phase; it is preferable to generate, in the second amplitude adjustment, a fourth output signal by adjusting an amplitude of the second output signal in such a manner that the level of the second output signal and the level of the first output signal become equal when the phase of the main signal is the second reference phase; and it is preferable to output the reference signal that starts at a timing when the level of the second output signal and the level of the third output signal become equal and ends at a timing when the level of the first output signal and the level of the fourth output signal become equal.

According to the first exemplary aspect of the present invention, it is preferable that the optical encoder include a plurality of pairs of the first and second light-receiving elements aligned in the length measuring direction of the scale, the plurality of pairs of the first and second light-receiving elements respectively corresponding to a plurality of reference point detection patterns aligned in the length measuring direction of the scale, and it is also preferable that the first output signal be generated by adding signals output from the plurality of first light-receiving elements and the second output signal be generated by adding signals output from the plurality of second light-receiving elements.

According to the first exemplary aspect of the present invention, it is preferable that a first light-receiving element array including the first and second light-receiving elements be provided; a second light-receiving element array including the first and second light-receiving elements be provided; the first amplitude adjustment be performed on the first output signal output from the first light-receiving element of the first light-receiving element array, and on the second output signal output from the second light-receiving element of the first light-receiving element array; and the second amplitude adjustment be performed on the first output signal output from the first light-receiving element of the second light-receiving element array, and on the second output signal output from the second light-receiving element of the second light-receiving element.

According to the first exemplary aspect of the present invention, it is preferable that the first output signal output from the first light-receiving element of the second light-receiving element array be delayed by a predetermined time with respect to the first output signal output from the first light-receiving element of the first light-receiving element array, and that the second output signal output from the second light-receiving element of the second light-receiving element array be delayed by the predetermined time with respect to the second output signal output from the second light-receiving element of the first light-receiving element array.

According to the first exemplary aspect of the present invention, it is preferable that the first light-receiving element of the second light-receiving element array and the first light-receiving element of the first light-receiving element array be arranged with an offset in the length measuring direction of the scale, and that the second light-receiving element of the second light-receiving element array and the second light-receiving element of the first light-receiving element array be arranged with an offset in the length measuring direction of the scale.

According to the first exemplary aspect of the present invention, it is preferable that a plurality of light-receiving regions each including the first and second light-receiving element arrays be provided, the plurality of light-receiving regions being aligned in a direction orthogonal to the length measuring direction of the scale; the first amplitude adjustment be performed on a signal obtained by adding the first output signals output from the first light-receiving element arrays of the plurality of light-receiving regions, and on a signal obtained by adding the second output signals output from the first light-receiving element arrays of the plurality of light-receiving regions; and the second amplitude adjustment be performed on a signal obtained by adding the first output signals output from the second light-receiving element arrays of the plurality of light-receiving regions, and on a signal obtained by adding the second output signals output from the second light-receiving element arrays of the plurality of light-receiving regions.

According to the first exemplary aspect of the present invention, it is preferable to generate the third output signal by providing a gain to the first output signal, and to generate the fourth output signal by providing a gain to the second output signal.

According to the first exemplary aspect of the present invention, it is preferable to generate the third output signal by reducing the first output signal, and to generate the fourth output signal by reducing the second output signal.

According to the first exemplary aspect of the present invention, it is preferable that the reference signal generation method further include: moving the detection head along the scale to detect a first timing when a level of the second output signal and a level of the third output signal become equal, and a second timing when a level of the first output signal and a level of the fourth output signal become equal; correcting the third output signal by multiplying the third output signal by a ratio of a value of the second output signal to a value of the third output signal when the phase of the main signal is the first reference phase; correcting the fourth output signal by multiplying the fourth output signal by a ratio of a value of the first output signal to a value of the fourth output signal when the phase of the main signal is the second reference phase; calculating a corrected first timing when the level of the second output signal and the level of the corrected third output signal become equal; calculating a corrected second timing when the level of the first output signal and the level of the corrected fourth output signal become equal; and outputting a reference output that starts at the corrected first timing and ends at the corrected second timing.

A second exemplary aspect of the present invention is an optical encoder including: a scale including a reference point detection pattern and a displacement detection pattern; a detection head including: a light source that emits light to the scale; a first light-receiving element and a second light-receiving element which receive light emitted from the reference point detection pattern when light is irradiated on the reference point detection pattern by the light source, the first light-receiving element and the second light-receiving element being arranged in parallel in a length measuring direction of the scale; and a main signal detection unit that detects a main signal from light transmitted through the displacement detection pattern; and a reference signal generation unit that generates a reference signal based on output signals from the first light-receiving element and the second light-receiving element. The reference signal generation unit is configured to: generate a first output signal based on an amount of light received by the first light-receiving element when the detection head is moved along the scale; generate a second output signal based on an amount of light received by the second light-receiving element when the detection head is moved along the scale; perform a first amplitude adjustment to adjust an amplitude of one of the first output signal and the second output signal in such a manner that a level of the first output signal and a level of the second output signal become equal when a phase of the main signal is a first reference phase; perform a second amplitude adjustment to adjust an amplitude of one of the first output signal and the second output signal in such a manner that the level of the first output signal and the level of the second output signal become equal when the phase of the main signal is a second reference phase; and output a reference signal that starts at a timing when the level of the second output signal and the level of the first output signal subjected to the first amplitude adjustment become equal and ends at a timing when the level of the second output signal and the level of the first output signal subjected to the second amplitude adjustment become equal.

According to the present invention, it is possible to stably provide a reference signal with a constant width and timing.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

An optical encoder according to a first exemplary embodiment of the present invention will be described below with reference to FIGS. 1 to 10.

Figure 1:
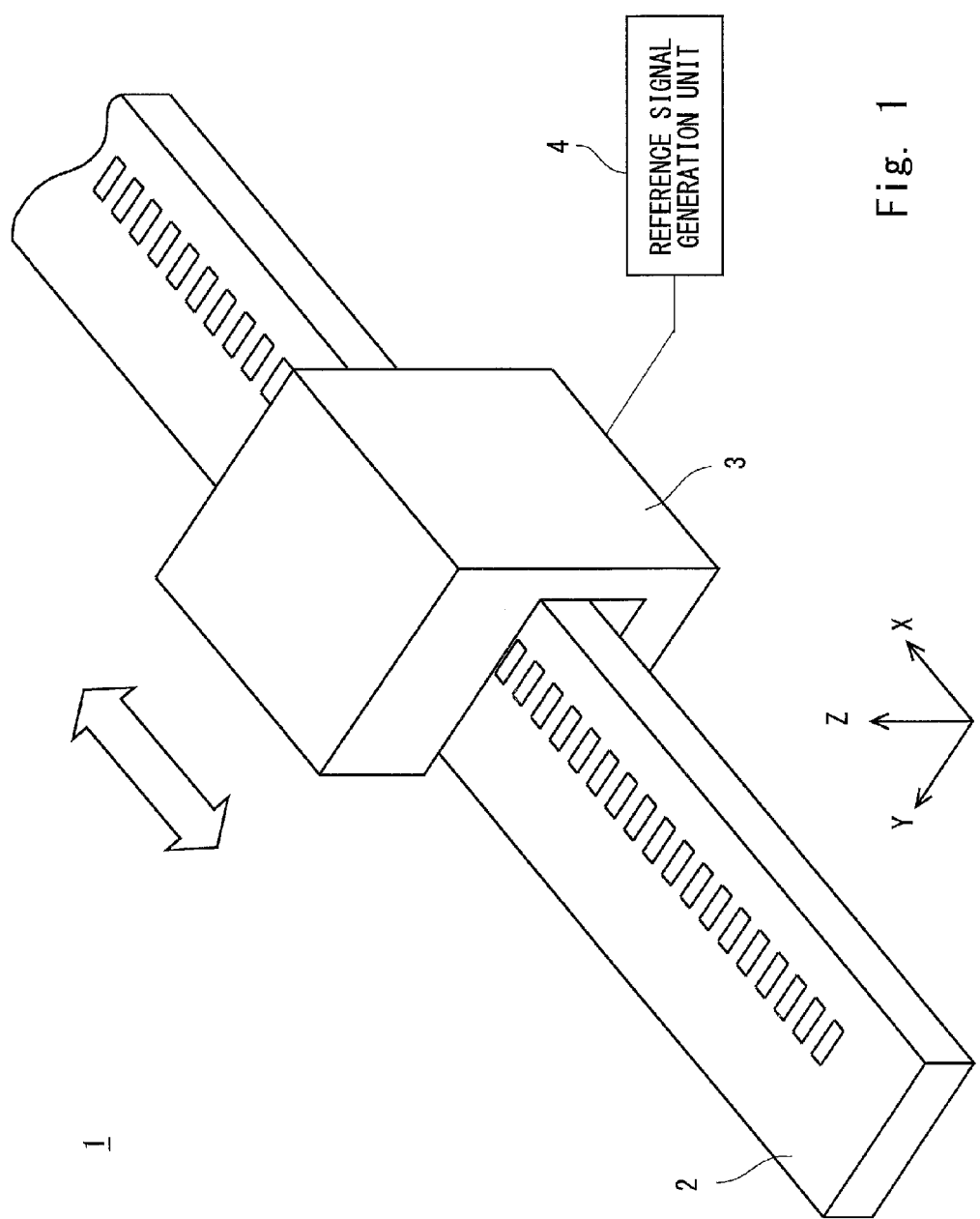
FIG. 1 is a perspective view showing an optical encoder according to a first exemplary embodiment.

As shown in FIG. 1, an optical encoder 1 includes a longitudinally-extending scale 2, a detection head 3 which is movable along the scale 2, and a reference signal generation unit 4 (reference signal generation unit) which generates a reference signal based on an output from the detection head 3. The optical encoder 1 detects a movement of the detection head 3 relative to the scale 2.

Figure 2:
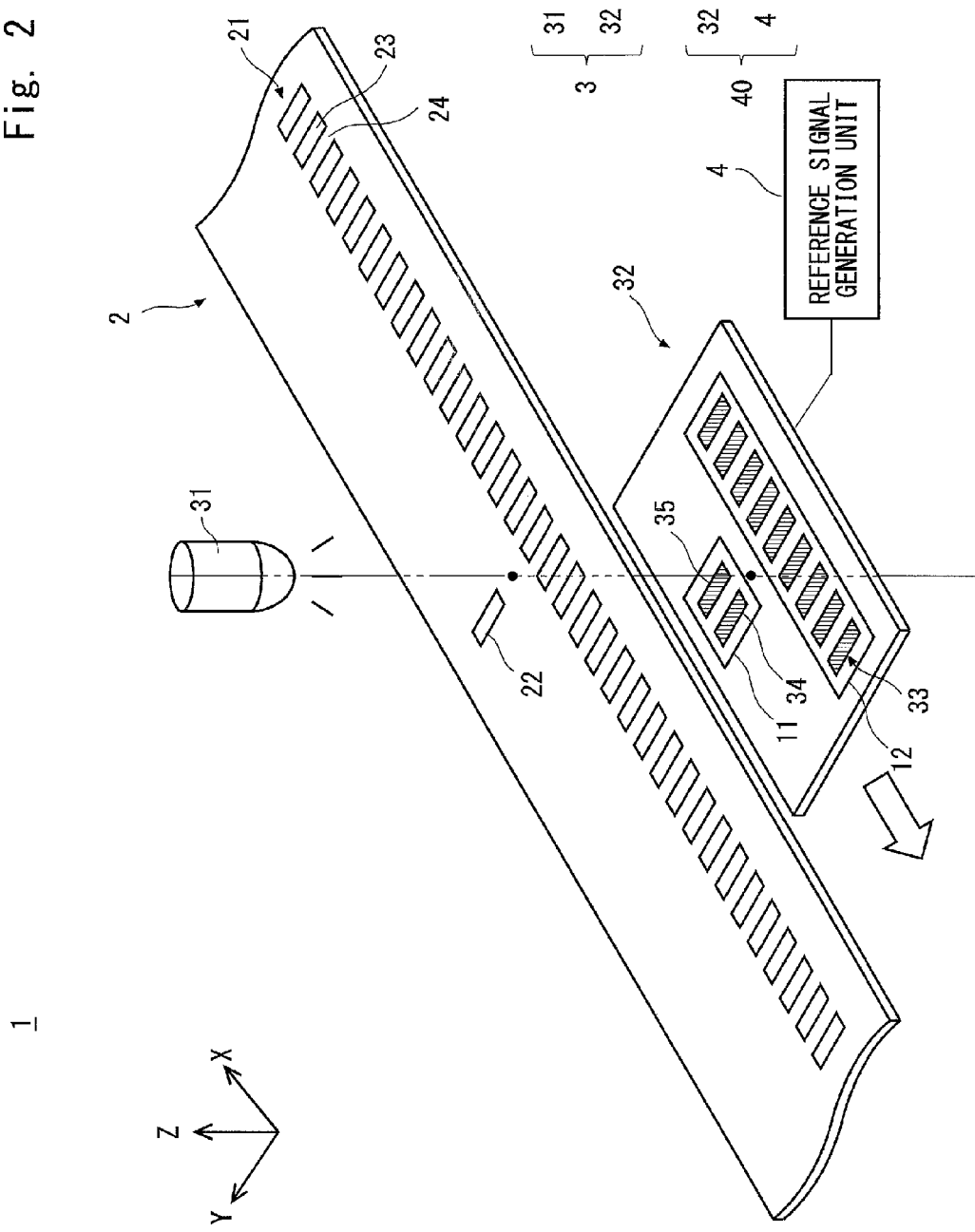
FIG. 2 is a perspective view showing the optical encoder according to the first exemplary embodiment.

FIG. 2 shows details of the inside of the detection head 3 and the scale 2. As shown in FIG. 2, the scale 2 includes a displacement detection pattern 21 and a reference point detection pattern 22. The displacement detection pattern 21 is formed by alternately arranging a light transmissive portion 23 and a non-transmissive portion 24 at a constant pitch in an X direction. The reference point detection pattern 22 is a slit extending in a direction (Y direction) vertical to a length measuring direction (X direction) of the scale 2.

The detection head 3 includes a light source 31 which emits light onto the scale 2, and a light-receiving unit 32 which is disposed at a position opposed to the light source 31 with the scale 2 interposed therebetween. In other words, the light source 31, the scale 2, and the light-receiving unit 32 are aligned in a Z direction. The light-receiving unit 32 includes a reference point detection light-receiving unit 11 and a displacement detection light-receiving unit 12. The reference point detection light-receiving unit 11 includes a first light-receiving element 34 and a second light-receiving element 35. The displacement detection light-receiving unit 12 includes a main signal light-receiving grating 33 (main signal detection unit). The reference signal generation apparatus 40 includes a light-receiving unit 32 and the reference signal generation unit 4.

The first light-receiving element 34 and the second light-receiving element 35 are arranged in parallel in the length measuring direction (the X direction corresponding to the direction of movement of the detection head 3) of the scale 2, and receives light transmitted through the reference point detection pattern 22. The first light-receiving element 34 and the second light-receiving element 35 are arranged so as to be separated from the main signal light-receiving grating 33 in the Y direction. In the example shown in FIG. 2, the detection head 3 (the light source 31 and the light-receiving unit 32) moves in a −X direction with respect to the scale 2. The light transmitted through the reference point detection pattern 22 is first incident on the first light-receiving element 34 and is then incident on the second light-receiving element 35.

The main signal light-receiving grating 33 detects a main signal from the light transmitted through the displacement detection pattern 21. In FIG. 2, the light-receiving portions of the main signal light-receiving grating 33 are indicated by hatching. The main signal detected by the main signal light-receiving grating 33 includes an A-phase signal and a B-phase signal having a phase different from the phase of the A-phase signal by 90°. In a case where the A-phase signal is a sine wave that starts at 0°, when the phase of the A-phase signal is 135° and 225°, the A-phase signal and the B-phase signal cross each other and a cross-point is formed.

The reference signal generation unit 4 generates a reference signal based on output signals from the first light-receiving element 34 and the second light-receiving element 35. When the detection head 3 passes through the reference point detection pattern 22, the output signals from the first light-receiving element 34 and the second light-receiving element 35 increase or decrease. Since the first light-receiving element 34 and the second light-receiving element 35 are arranged so as to be separated from each other in the X direction, a time difference occurs between an increase or decrease in the output from the first light-receiving element 34 and an increase or decrease in the output from the second light-receiving element 35.

Figure 3:
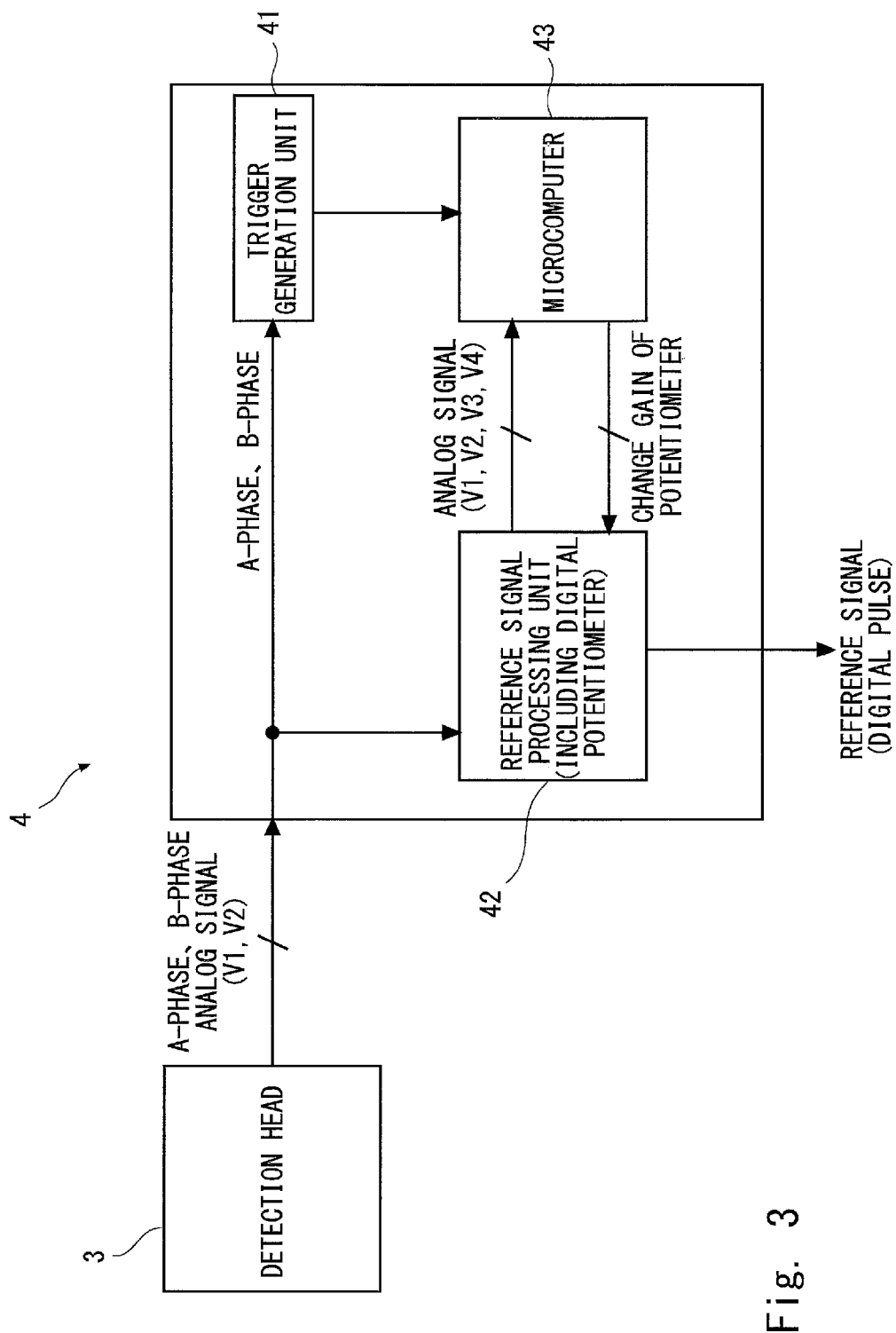
FIG. 3 is a block diagram showing a reference signal generation unit according to the first exemplary embodiment.

FIG. 3 is a block diagram showing the configuration of the reference signal generation unit 4. As shown in FIG. 3, the reference signal generation unit 4 includes a trigger generation unit 41, a reference signal processing unit 42, and a microcomputer 43.

The trigger generation unit 41 receives the A-phase signal and the B-phase signal from the detection head 3, and generates a trigger signal at a timing when the phase of the A-phase signal is 225°. The trigger generation unit 41 outputs the generated trigger signal to the microcomputer 43.

The reference signal processing unit 42 receives, from the detection head 3, the A-phase signal, the B-phase signal, a first output signal V1, and a second output signal V2. The reference signal processing unit 42 generates a gate signal G by calculating the sum of the first output signal V1 and the second output signal V2, and outputs the generated gate signal G to the microcomputer 43.

The reference signal processing unit 42 includes digital potentiometers, and generates a third output signal V3 by providing a gain to the first output signal V1 and also generates a fourth output signal V4 by providing a gain to the second output signal V2. In the reference signal processing unit 42, the gains provided to the first output signal V1 and the second output signal V2 can be changed by the digital potentiometers. Accordingly, the amplitude values of the third output signal V3 and the fourth output signal V4 can be changed.

Figure 4:
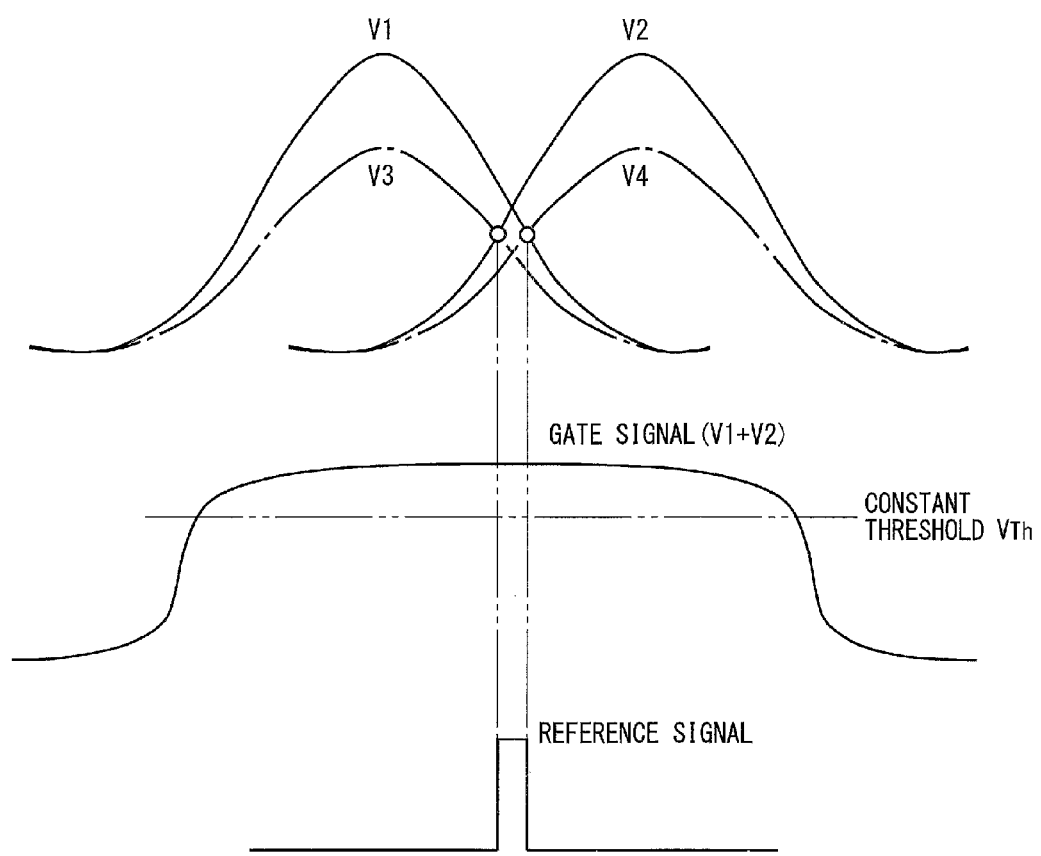
FIG. 4 is a diagram for explaining a reference signal generation method according to the first exemplary embodiment.

As shown in FIG. 4, the reference signal processing unit 42 generates the reference signal by taking a logical AND when three conditions, i.e., (a) V1>V4 holds, (b) V2>V3 holds, and (c) the gate signal exceeds a threshold voltage $V_{Th}$ and is active, are met. Then the reference signal processing unit 42 outputs the generated reference signal to the outside of the reference signal generation unit 4.

As shown in FIG. 3, the first to fourth output signals V1 to V4 are sent to the microcomputer 43 from the reference signal processing unit 42. The microcomputer 43 calculates gains to be provided to the third output signal V3 and the fourth output signal V4 so as to obtain the reference signal with a desired width and timing by using the first to fourth output signals V1 to V4. The microcomputer 43 outputs, to the reference signal processing unit 42, an instruction to change the gain of each digital potentiometer of the reference signal processing unit 42.

Figure 5:
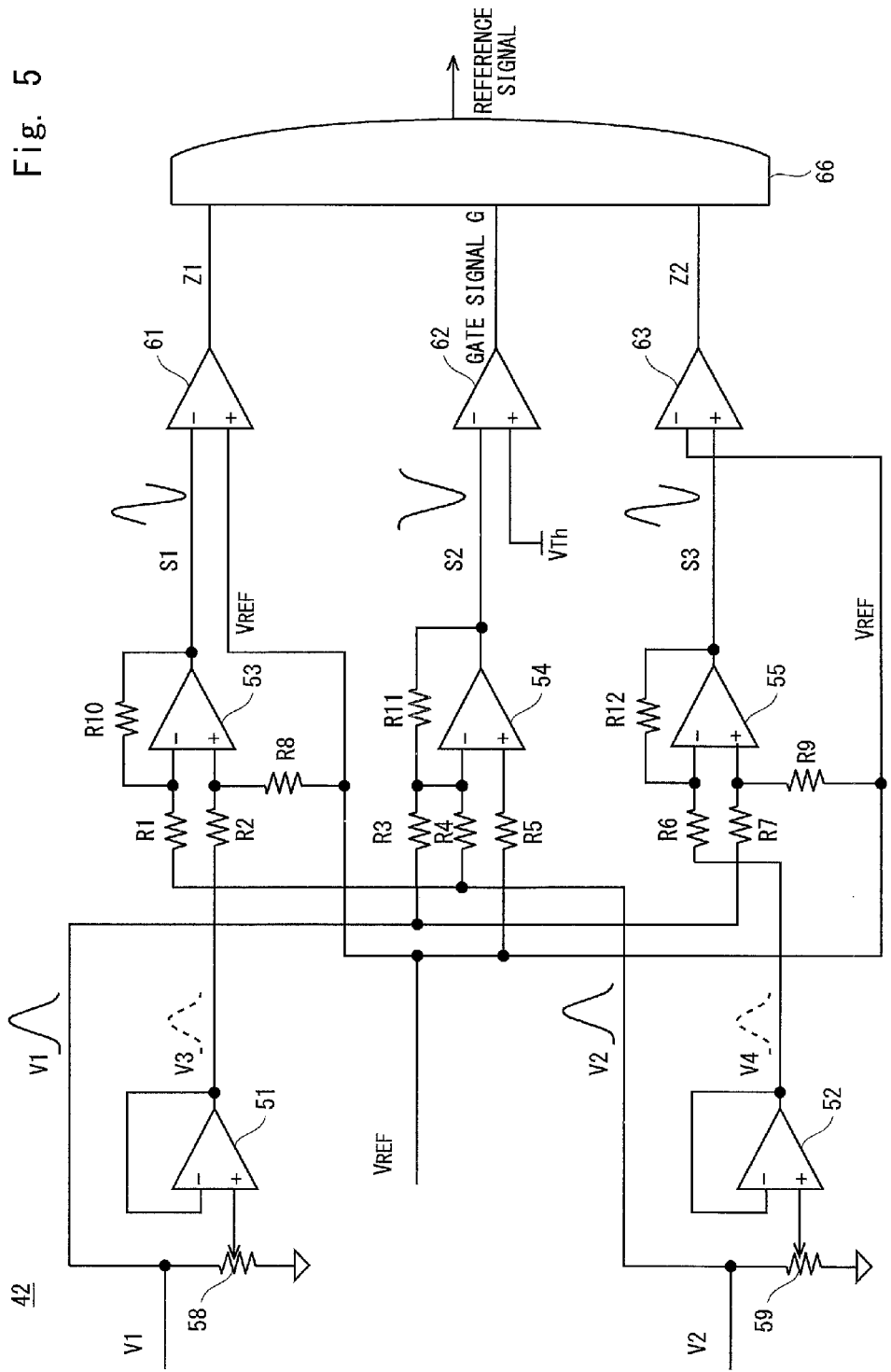
FIG. 5 is a circuit diagram showing examples of circuits of a reference signal processing unit according to the first exemplary embodiment.

FIG. 5 is a circuit diagram showing specific examples of circuits constituting the reference signal processing unit 42. As shown in FIG. 5, the reference signal processing unit 42 includes amplifiers 51 to 55, comparators 61 to 63, an AND circuit 66, digital potentiometers 58 and 59, and resistors R1 to R12.

The first output signal V1, which is output from the first light-receiving element 34, and the second output signal V2, which is output from the second light-receiving element 35, are input to the reference signal processing unit 42.

The digital potentiometer 58 receives the first output signal V1. A voltage obtained by adjusting the level of the first output signal V1 by the digital potentiometer 58 is input to a non-inverting input terminal of the amplifier 51. An inverting input terminal of the amplifier 51 is connected to an output terminal of the amplifier 51. Accordingly, the third output signal V3 obtained by adjusting the amplitude of the first output signal V1 is output from the output terminal of the amplifier 51.

The digital potentiometer 59 receives the second output signal V2. A voltage obtained by adjusting the level of the second output signal V2 by the digital potentiometer 59 is input to a non-inverting input terminal of the amplifier 52. An inverting input terminal of the amplifier 52 is connected to an output terminal of the amplifier 52. Accordingly, the fourth output signal V4 obtained by adjusting the amplitude of the second output signal V2 is output from the output terminal of the amplifier 52.

One end of the resistor R1 receives the second output signal V2, and the other end of the resistor R1 is connected to an inverting input terminal of the amplifier 53. One end of the resistor R2 is connected to the output terminal of the amplifier 51, and receives the third output signal V3. The other end of the resistor R2 is connected to a non-inverting input terminal of the amplifier 53. One end of the resistor R8 receives a reference voltage $V_{REF}$, and the other end of the resistor R8 is connected to the non-inverting input terminal of the amplifier 53. One end of the resistor R10 is connected to the inverting input terminal of the amplifier 53, and the other end of the resistor R10 is connected to an output terminal of the amplifier 53. The resistors R1, R2, R8, and R10 have the same resistance value. Accordingly, a voltage of a signal S1 output from the output terminal of the amplifier 53 is expressed as $(V3-V2+V_{REF})$.

One end of the resistor R3 receives the first output signal V1, and the other end of the resistor R3 is connected to an inverting input terminal of the amplifier 54. One end of the resistor R4 receives the second output signal V2, and the other end of the resistor R4 is connected to the inverting input terminal of the amplifier 54. One end of the resistor R5 receives the reference voltage $V_{REF}$, and the other end of the resistor R5 is connected to a non-inverting input terminal of the amplifier 54. One end of the resistor R11 is connected to the inverting input terminal of the amplifier 54, and the other end of the resistor R11 is connected to an output terminal of the amplifier 54. The resistors R3, R4, R5, and R11 have the same resistance value. Accordingly, a voltage of a signal S2 output from the output terminal of the amplifier 54 is expressed as $(-V1-V2+V_{REF})$.

One end of the resistor R6 receives the fourth output signal V4, and the other end of the resistor R6 is connected to an inverting input terminal of the amplifier 55. One end of the resistor R7 receives the first output signal V1, and the other end of the resistor R7 is connected to a non-inverting input terminal of the amplifier 55. One end of the resistor R9 receives the reference voltage $V_{REF}$, and the other end of the resistor R9 is connected to the non-inverting input terminal of the amplifier 55. One end of the resistor R12 is connected to the inverting input terminal of the amplifier 55, and the other end of the resistor R12 is connected to an output terminal of the amplifier 55. The resistors R6, R7, R9, and R12 have the same resistance value. Accordingly, a voltage of a signal S3 output from the output terminal of the amplifier 55 is expressed as $(V1-V4+V_{REF})$.

An inverting input terminal of the comparator 61 is connected to the output terminal of the amplifier 53. The signal S1 is input to the inverting input terminal of the comparator 61. The reference voltage $V_{REF}$ is input to a non-inverting input terminal of the comparator 61. Accordingly, a signal Z1 is output from an output terminal of the comparator 61, and the voltage of the signal Z1 is expressed as (V2-V3).

An inverting input terminal of the comparator 62 is connected to the output terminal of the amplifier 54. The signal S2 is input to the inverting input terminal of the comparator 62. The threshold voltage $V_{Th}$ is input to a non-inverting input terminal of the comparator 62. Accordingly, the gate signal G is output from an output terminal of the comparator 62, and the voltage of the signal G is expressed as (V1+V2).

A non-inverting input terminal of the comparator 63 is connected to the output terminal of the amplifier 55. The signal S3 is input to the non-inverting input terminal of the comparator 63. The reference voltage $V_{REF}$ is input to an inverting input terminal of the comparator 63. Accordingly, a signal Z2 is output from an output terminal of the comparator 63, and the voltage of the signal Z2 is expressed as (V1−V4).

The output terminals of the comparators 61, 62, and 63 are each connected to an input terminal of the AND circuit 66. An output terminal of the AND circuit 66 is connected to the outside of the reference signal processing unit 42. The AND circuit 66 generates the reference signal by taking a logical AND of the signal Z1, the signal Z2, and the gate signal G, and outputs the reference signal from the output terminal of the AND circuit 66.

Figure 6:
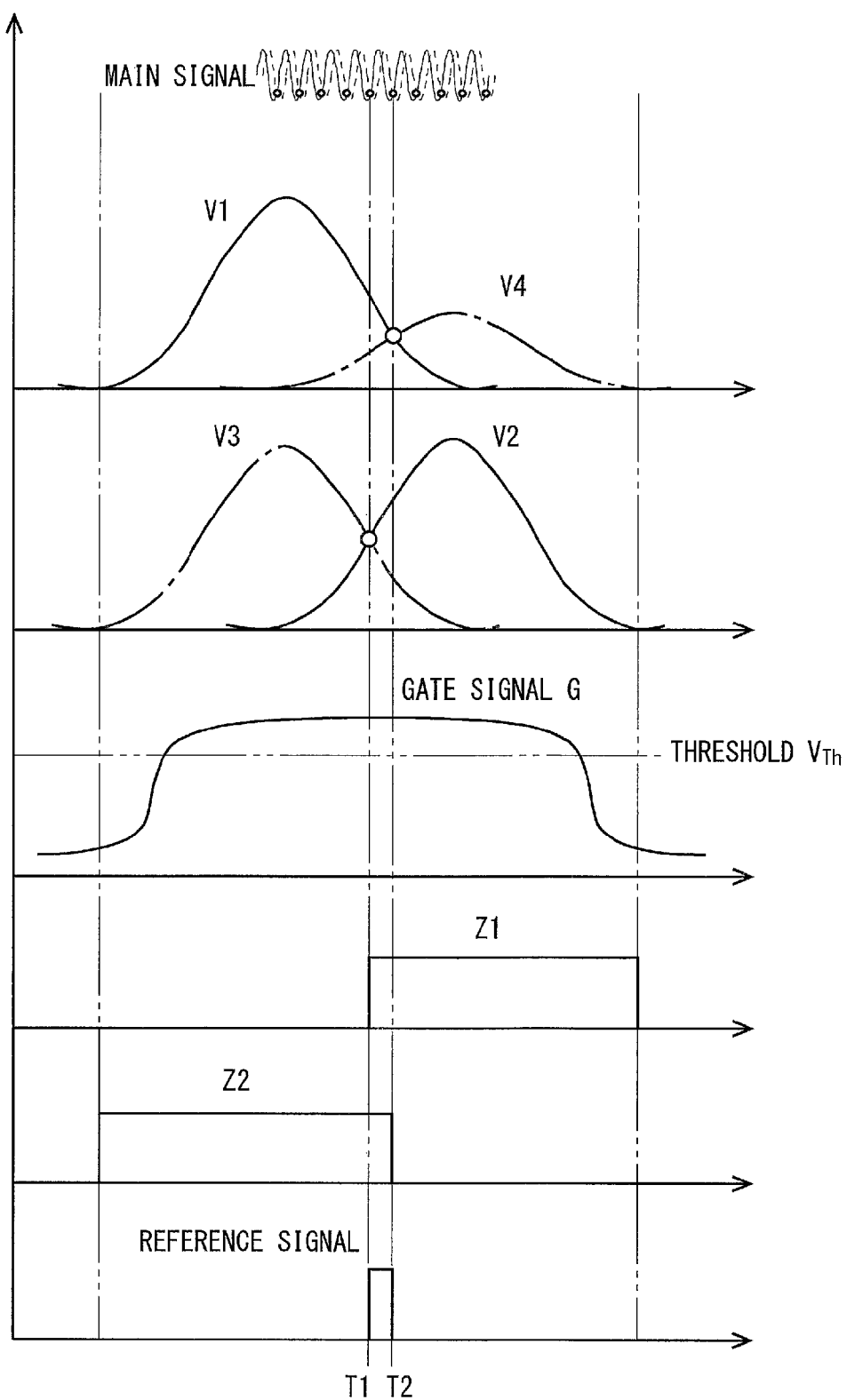
FIG. 6 is a timing chart showing an operation of the reference signal processing unit according to the first exemplary embodiment.

FIG. 6 is a timing chart showing an operation of the reference signal processing unit 42.

First, as shown in FIG. 6, the first light-receiving element 34 reads the reference point detection pattern 22, so that a reading waveform is generated in the first output signal V1. At the same time, the reference signal processing unit 42 generates the third output signal V3 by providing a gain to the first output signal V1, so that a reading waveform is generated in the third output signal V3. Further, at the time when the first output signal V1 rises, the signal Z2 becomes HIGH.

Next, the second light-receiving element 35 reads the reference point detection pattern 22, so that a reading waveform is generated in the second output signal V2. At the same time, the reference signal processing unit 42 generates the fourth output signal V4 by providing a gain to the second output signal V2, so that a reading waveform is generated in the fourth output signal V4.

Then, at a timing T1 when the level of the second output signal V2 becomes equal to the level of the third output signal V3, the signal Z1 becomes HIGH. At a timing T2 when the level of the first output signal V1 is equal to the level of the fourth output signal V4, the signal Z2 becomes LOW. Subsequently, at the time when the second output signal V2 falls, the signal Z1 becomes LOW.

The reference signal processing unit 42 generates the reference signal by taking a logical AND of the signal Z1 and the signal Z2 when the gate signal G (V1+V2) exceeds the threshold voltage $V_{Th}$ and is active. The timing T1 corresponds to the starting point of the reference signal, and the timing T2 corresponds to the end point of the reference signal.

Figure 7:
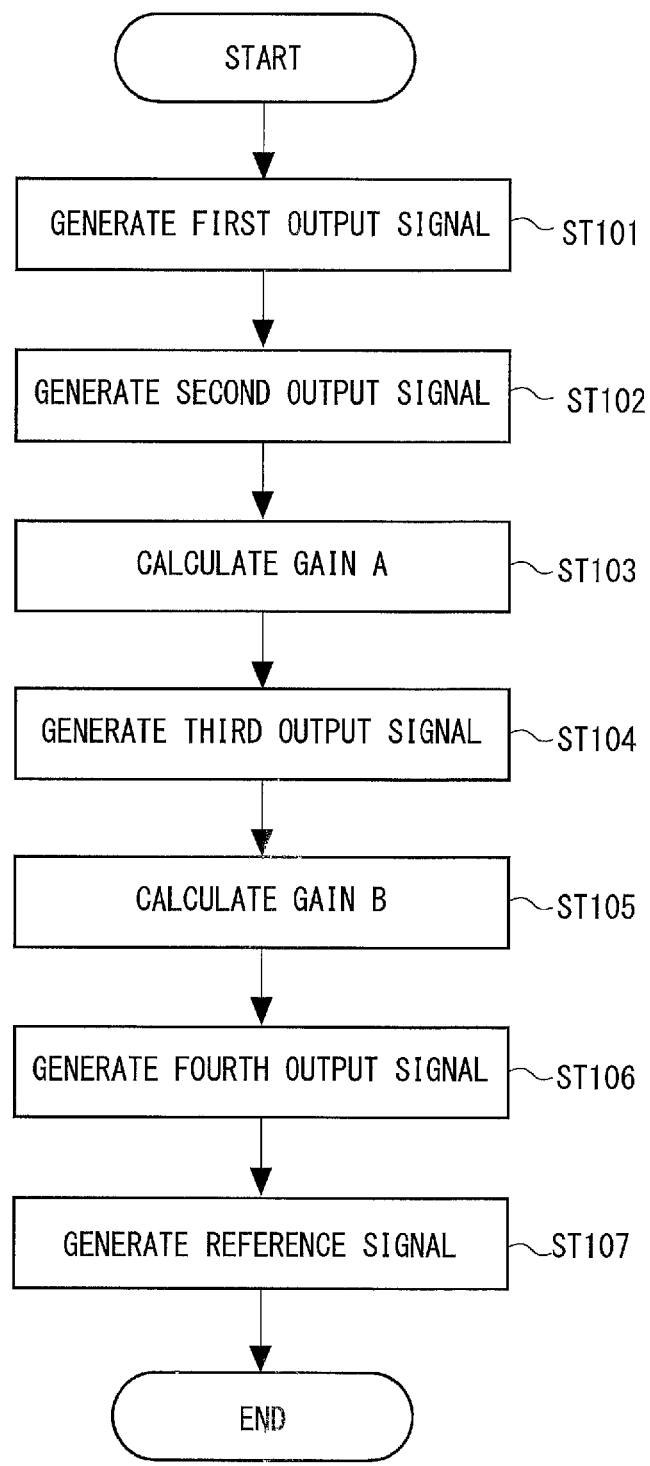
FIG. 7 is a flowchart for explaining a flow of the reference signal generation method according to the first exemplary embodiment.

A method in which the reference signal generation unit 4 generates a reference signal will be described with reference to the flowchart shown in FIG. 7.

Figure 8:
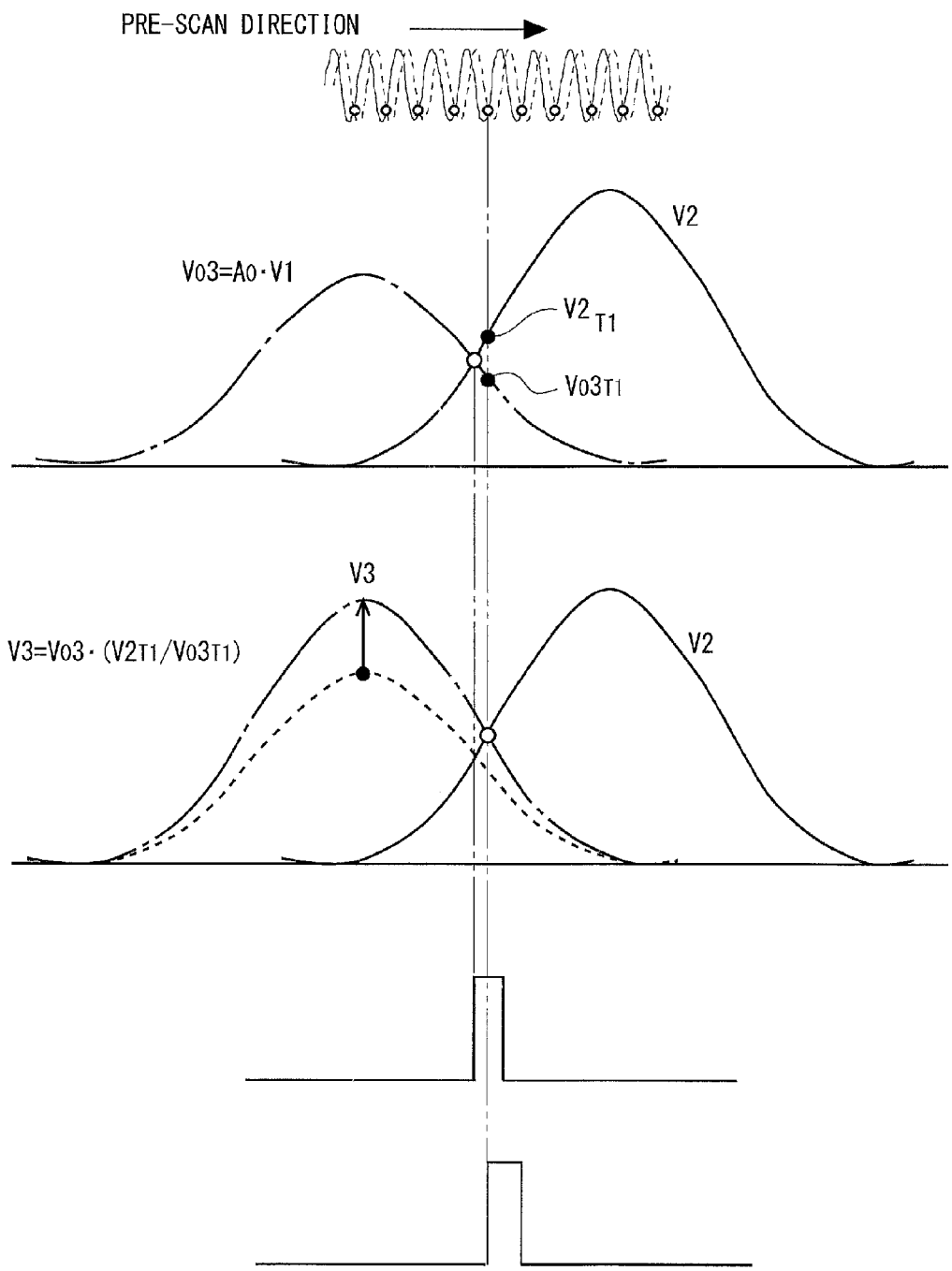
FIG. 8 is a diagram for explaining a method for generating a third output signal.
Figure 9:
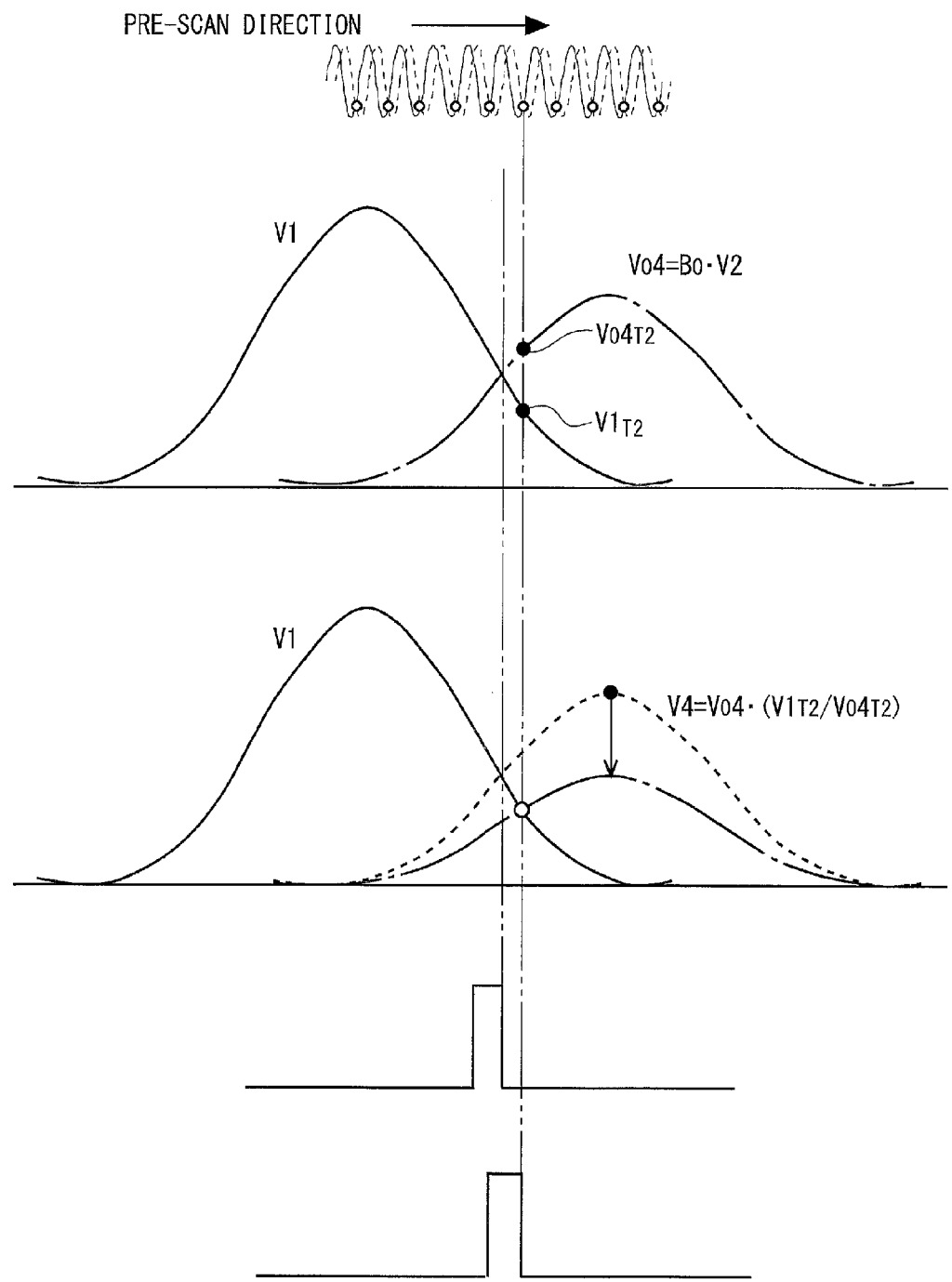
FIG. 9 is a diagram for explaining a method for generating a fourth output signal.

As shown in FIG. 9, the reference signal generation unit 4 generates the first output signal V1 based on the amount of light received by the first light-receiving element 34 when the detection head 3 is moved above the scale 2 (ST101). Further, as shown in FIG. 8, the reference signal generation unit 4 generates the second output signal V2 based on the amount of light received by the second light-receiving element 35 when the detection head 3 is moved above the scale 2 (ST102).

(First Amplitude Adjustment)

Next, as shown in FIG. 8, the microcomputer 42 of the reference signal generation unit 4 calculates a gain A to be provided to the first output signal V1, when the third output signal V3 is generated in such a manner that the level of the third output signal V3 becomes equal to the level of the second output signal V2 at the timing T1 (first reference phase) when the phase of the A-phase signal first becomes 225° after the level of the second output signal V2 becomes higher than the level of the first output signal V1 (ST103). Then, the reference signal generation unit 4 provides the gain A to the first output signal V1 to reduce the first output signal V1, thereby generating the third output signal V3 (ST104).

The method for calculating the gain A will be described in more detail. First, a third output signal $V_0 3$, which has not been corrected, is generated by providing a predetermined gain $A_0$ to the first output signal V1. At the timing T1, the amplitude value of the second output signal V2 is represented by $V2_{T1}$ and the amplitude value of the third output signal $V_0 3$, which has not been corrected, is represented by $V_0 3_{T1}$. The reference signal generation unit 4 multiplies the third output signal $V_0 3$, which has not been corrected, by the ratio of the amplitude value $V2_{T1}$ of the second output signal V2 to the amplitude value $V_0 3_{T1}$ of the third output signal $V_0 3$ at the timing T1, thereby generating the third output signal V3 having a desired amplitude value. That is, the following expressions hold. $V3=V_0 3 \cdot (V2_{T1}/V_0 3_{T1})=V1 \cdot A_0 \cdot (V2_{T1}/V_0 3_{T1})$  $A=A_0 \cdot (V2_{T1}/V_0 3_{T1})$ (Second Amplitude Adjustment)

Next, as shown in FIG. 9, the reference signal generation unit 4 calculates a gain B to be provided to the second output signal V2 when the fourth output signal V4 is generated, in such a manner that the level of the fourth output signal V4 becomes equal to the level of the first output signal V1 when the phase of the A-phase signal corresponds to the timing T2 (second reference phase) (ST105). The timing T2 is a timing when the phase of the A-phase signal advances by 360° from the timing T1 and becomes 225°. The reference signal generation unit 4 provides the gain B to the second output signal V2 to reduce the second output signal V2, thereby generating the fourth output signal V4 (ST106).

The method for calculating the gain B will be described in more detail. First, a fourth output signal $V_0 4$, which has not been corrected, is generated by providing a predetermined gain $B_0$ to the second output signal V2. At the timing T2, the amplitude value of the first output signal V1 is represented by $V1_{T2}$ and the amplitude value of the fourth output signal $V_0 4$, which has not been corrected, is represented by $V_0 4_{T2}$. The reference signal generation unit 4 multiplies the fourth output signal $V_0 4$, which has not been corrected, by the ratio of the amplitude value $V1_{T2}$ of the first output signal V1 to the amplitude value $V_0 4_{T2}$ of the fourth output signal $V_0 4$ at the timing T2, thereby generating the fourth output signal V4 having a desired amplitude value. That is, the following expressions hold.

$$V4=V_0 4 \cdot (V1_{T2}/V_0 4_{T2})=V2 \cdot B_0 \cdot (V1_{T2}/V_0 4_{T2})$$

$$B=B_0 \cdot (V1_{T2}/V_0 4_{T2})$$

Figure 10:
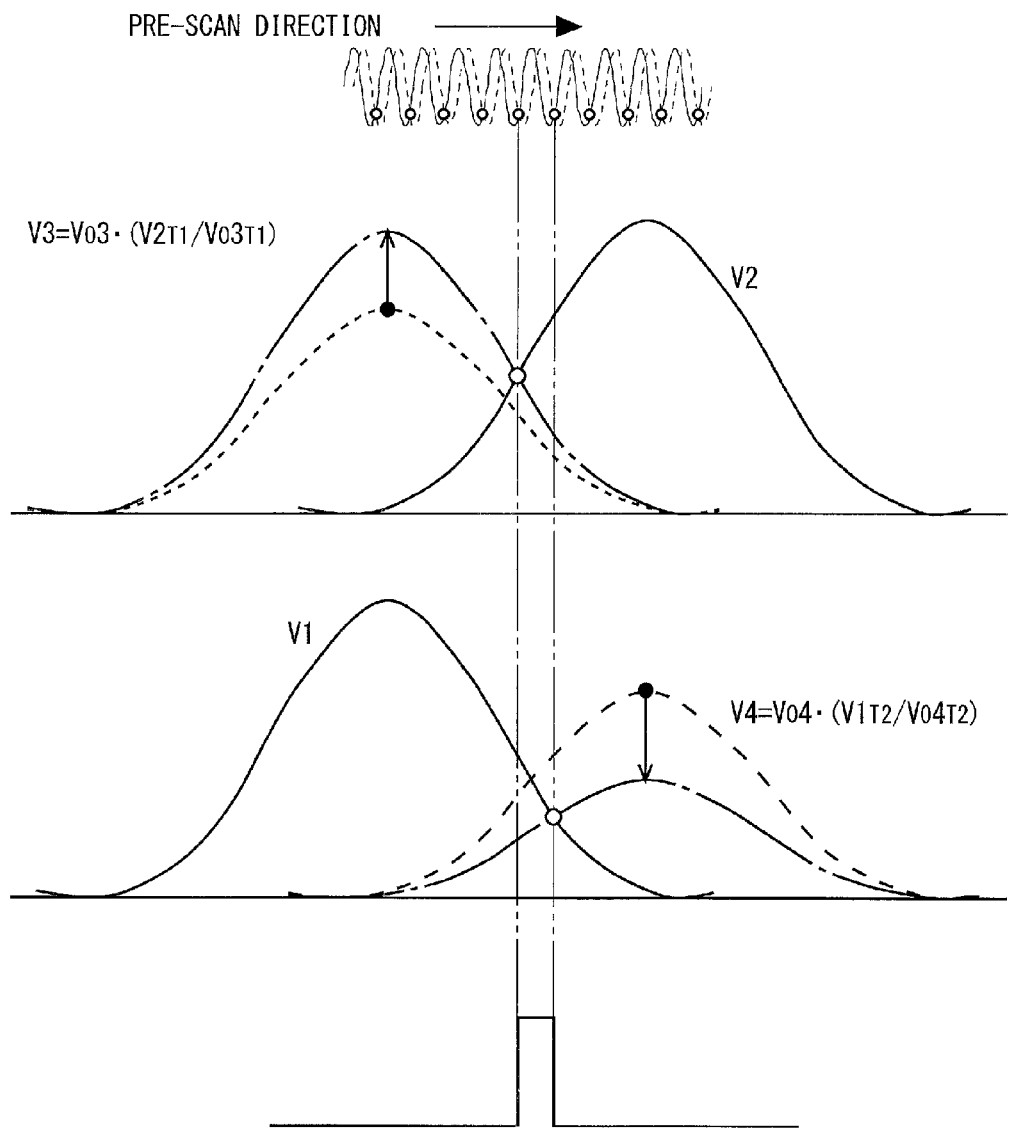
FIG. 10 is a diagram for explaining a method for obtaining a starting point and an end point of a reference signal.

Next, as shown in FIG. 10, the reference signal that starts at the timing T1 when the level of the second output signal V2 and the level of the third output signal V3 become equal and ends at the timing T2 when the level of the first output signal V1 and the level of the fourth output signal V4 become equal is output (ST107).

In the optical encoder 1, the gain A to be provided to the first output signal V1 is adjusted when the third output signal V3 is generated, in such a manner that the level of the third output signal V3 becomes equal to the level of the second output signal V2 at the timing T1. At the same time, the gain B to be provided to the second output signal V2 is adjusted when the fourth output signal V4 is generated, in such a manner that the level of the fourth output signal V4 becomes equal to the level of the first output signal V1 at the timing T2. The timing T1 corresponds to the starting point of the reference signal and the timing T2 corresponds to the end point of the reference signal. Accordingly, the width and timing of the reference signal can be adjusted freely by changing the timing T1 and the timing T2.

Furthermore, in the optical encoder 1, based on a trigger signal, a timing when the phase of the A-phase signal of the main signal becomes 225° is defined as the timing T1 and a timing when the phase of the A-phase signal advances by 360° from the timing T1 is defined as the timing T2. Accordingly, the optical encoder 1 can output the reference signal having a width of 360° based on the timing when the phase of the A-phase signal becomes 45°.

As described above, according to this exemplary embodiment, it is possible to stably provide a reference signal with a constant width and timing.

The above exemplary embodiment illustrates a case where the first light-receiving element 34 and the second light-receiving element 35 are moved in this order to a position below the reference point detection pattern 22. However, even when the second light-receiving element 35 and the first light-receiving element 34 are moved in this order to a position below the reference point detection pattern 22, the reference signal can be generated in the same manner as that when they are moved in the above-mentioned opposite order.

The above exemplary embodiment illustrates a case where the first light-receiving element 34 first detects the reference point detection pattern 22 and then the second light-receiving element 35 detects the reference point detection pattern 22. However, the detection head 3 may move in an opposite direction. Specifically, when the detection head 3 moves not in the −X direction but instead in a +X direction, the reference signal can be generated in the same manner as that described above by treating the second light-receiving element 35 as the first light-receiving element and treating the first light-receiving element 34 as the second light-receiving element.

Second Exemplary Embodiment

Figure 11:
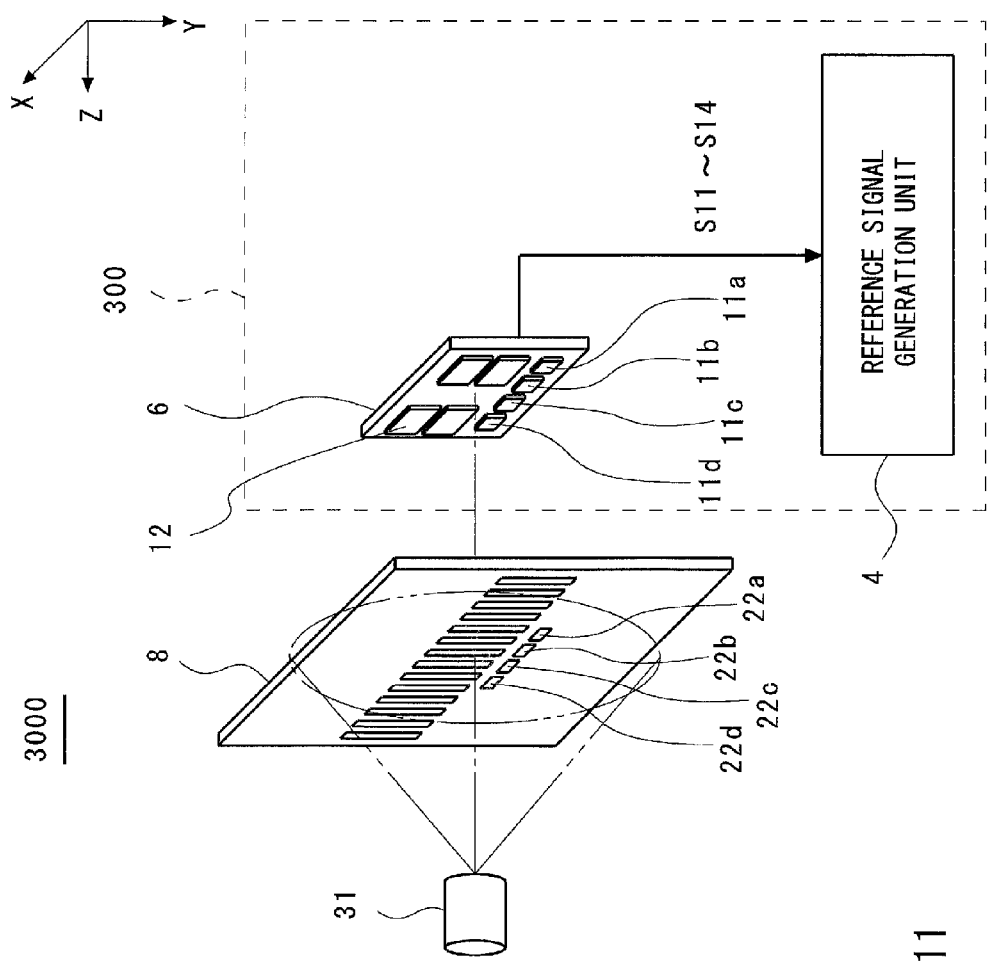
FIG. 11 is a perspective view schematically showing a configuration of an optical encoder according to a second exemplary embodiment.

Next, an optical encoder 3000 according to a second exemplary embodiment will be described. FIG. 11 is a perspective view schematically showing the configuration of the optical encoder 3000. The optical encoder 3000 has a configuration in which the scale 2 and the reference signal generation apparatus 40 of the optical encoder 1 are respectively replaced by a scale 8 and a reference signal generation apparatus 300.

The scale 8 includes reference point detection patterns 22a to 22d, which are arranged in the X direction, and the displacement detection pattern 21 formed thereon. The plurality of reference point detection patterns 22a to 22d are arranged along the length measuring direction (X direction) of the displacement detection pattern 21. The reference point detection patterns 22a to 22d are each similar to the reference point detection pattern 22, and thus the description thereof is omitted.

Figure 12:
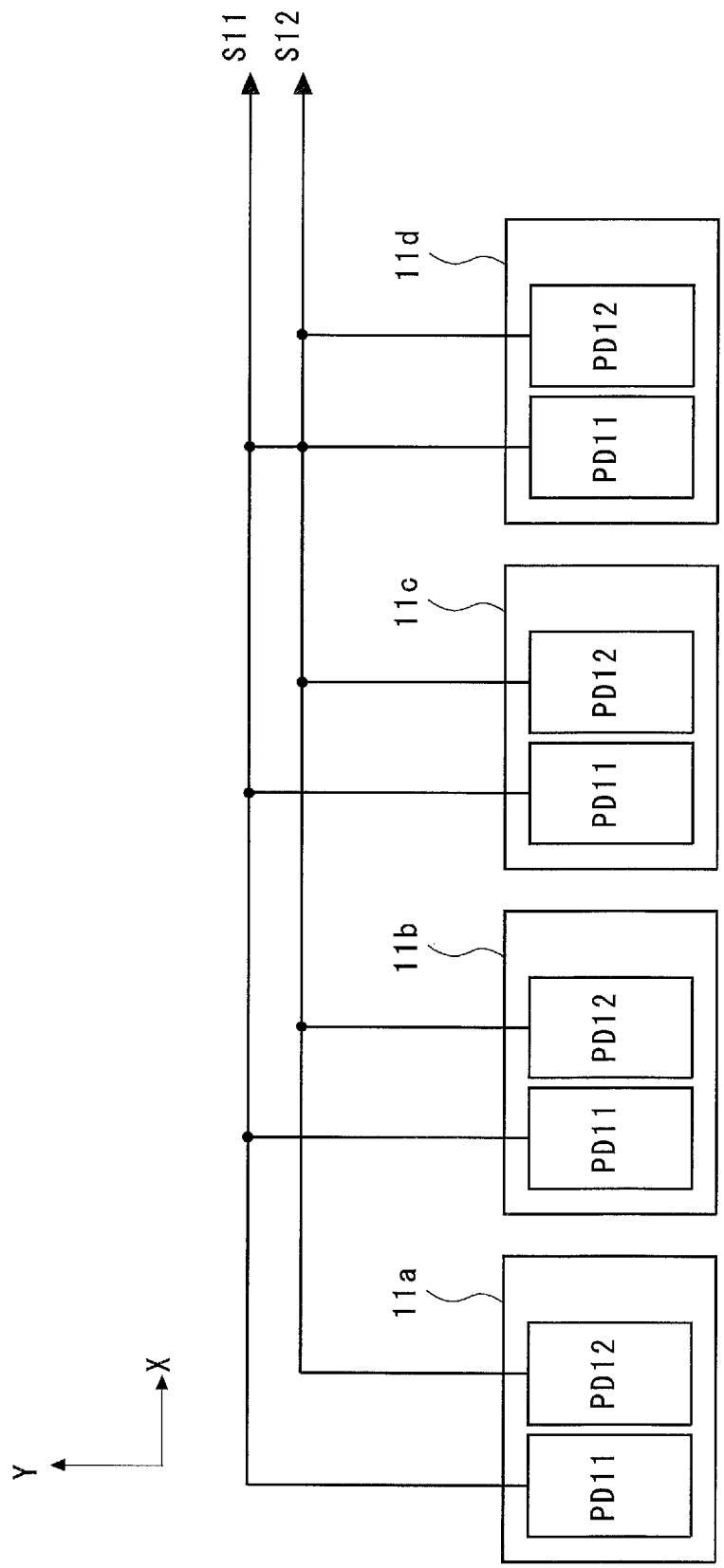
FIG. 12 is a top view schematically showing an arrangement of reference point detection light-receiving units according to the second exemplary embodiment.

The reference signal generation apparatus 300 includes a light-receiving unit 6 and the reference signal generation unit 4. The light-receiving unit 6 includes reference point detection light-receiving units 11a to 11d and the displacement detection light-receiving unit 12. FIG. 12 is a top view schematically showing an arrangement of the reference point detection light-receiving units 11a to 11d according to the second exemplary embodiment. As shown in FIG. 12, the reference point detection light-receiving units 11a to 11d are aligned in the X direction which is the reading direction. The reference point detection light-receiving units 11a to 11d are arranged at positions respectively corresponding to the reference point detection patterns 22a to 22d. The reference point detection light-receiving units 11a to 11d each have the same configuration as the reference point detection light-receiving unit 11 according to the first exemplary embodiment. The reference point detection light-receiving units 11a to 11d each include light-receiving elements PD11 and PD12. The light-receiving element PD11 corresponds to the first light-receiving element 34 and the light-receiving element PD12 corresponds to the second light-receiving element 35.

In the second exemplary embodiment, the plurality of reference point detection patterns 22a to 22d and the plurality of reference point detection light-receiving units 11a to 11d are provided, unlike in the first exemplary embodiment. A signal S11 obtained by adding output signals from the light-receiving elements PD11 of the reference point detection light-receiving units 11a to 11d is referred to as a first output signal, and a signal S12 obtained by adding output signals from the light-receiving elements PD12 of the reference point detection light-receiving units 11a to 11d is referred to as a second output signal. Accordingly, in the optical encoder 3000, a reference signal can be generated in the same manner as that in the optical encoder 1 according to the first exemplary embodiment, and in addition, an S/N ratio can be increased, so that the optical encoder 3000 is less likely to be affected by noise.

Third Exemplary Embodiment

Figure 13:
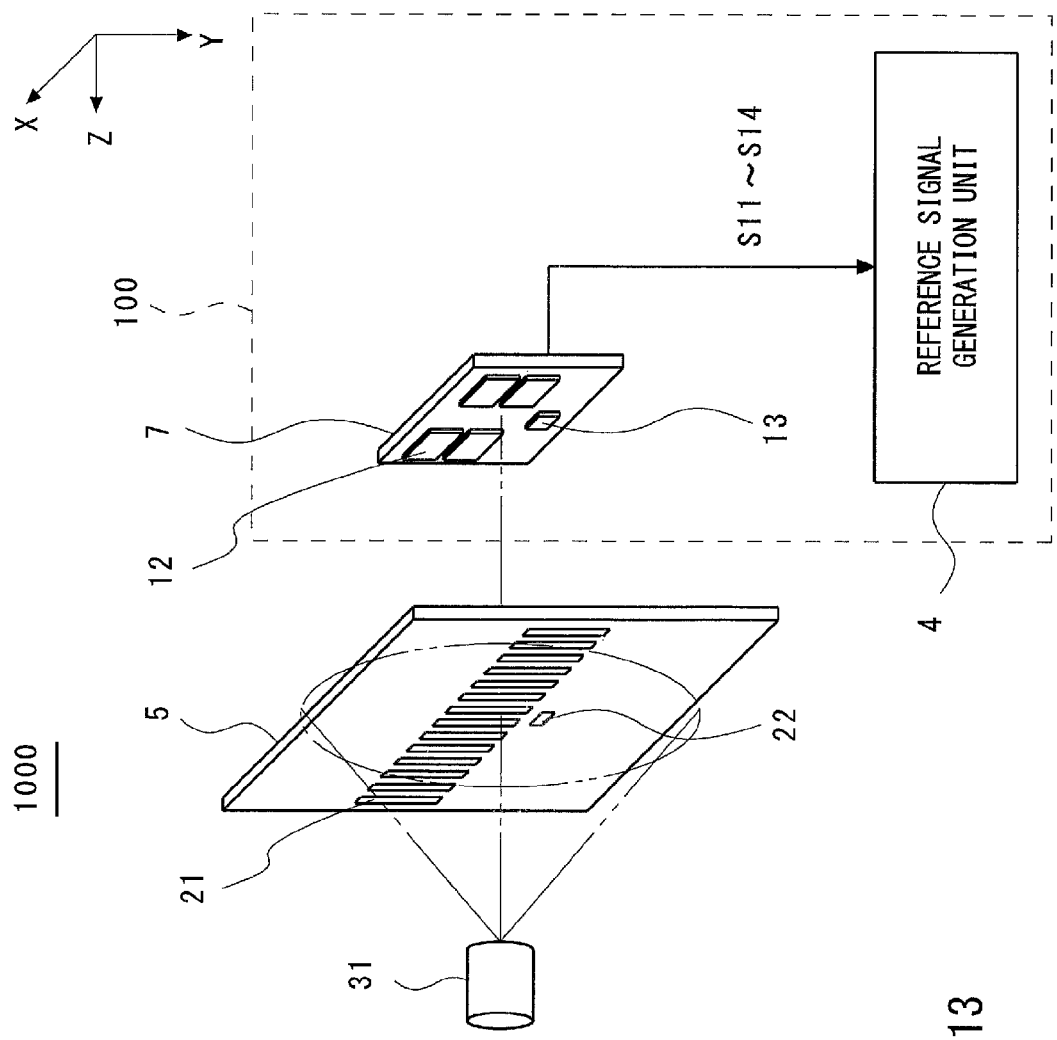
FIG. 13 is a perspective view schematically showing a configuration of an optical encoder according to a third exemplary embodiment.

FIG. 13 is a perspective view schematically showing a configuration of an optical encoder 1000 as an example of an optical encoder incorporating a reference signal generation apparatus 100 according to a third exemplary embodiment. The optical encoder 1000 includes the reference signal generation apparatus 100, the light source 31, and a scale 5.

The scale 5 includes the reference point detection pattern 22 and the displacement detection pattern 21 formed thereon. The reference point detection pattern 22 and the displacement detection pattern 21 are each formed as a slit perforated in a plate-like member.

The reference signal generation apparatus 100 is configured as an apparatus to read the reference point detection pattern 22 that is irradiated by light emitted from the light source 31 and generate a reference signal. Since the reference point detection pattern 22 is a slit, a contrast of the reference point detection pattern 22 is made different from that of surroundings of the reference point detection pattern 22 by the irradiated light. Accordingly, the reference signal generation apparatus 100 recognizes the reference point detection pattern 22 as a bright pattern.

The reference signal generation apparatus 100 includes a light-receiving unit 7 and the reference signal generation unit 4. The light-receiving unit 7 includes the displacement detection light-receiving unit 12 and a reference point detection light-receiving unit 13. The displacement detection light-receiving unit 12 reads a pattern of the displacement detection pattern 21 that is irradiated by light transmitted from the light source 31. The displacement detection light-receiving unit 12 outputs a signal indicating a read result to a displacement detection unit (not shown). The displacement detection unit (not shown) determines a detected displacement based on the received signal.

Figure 14:
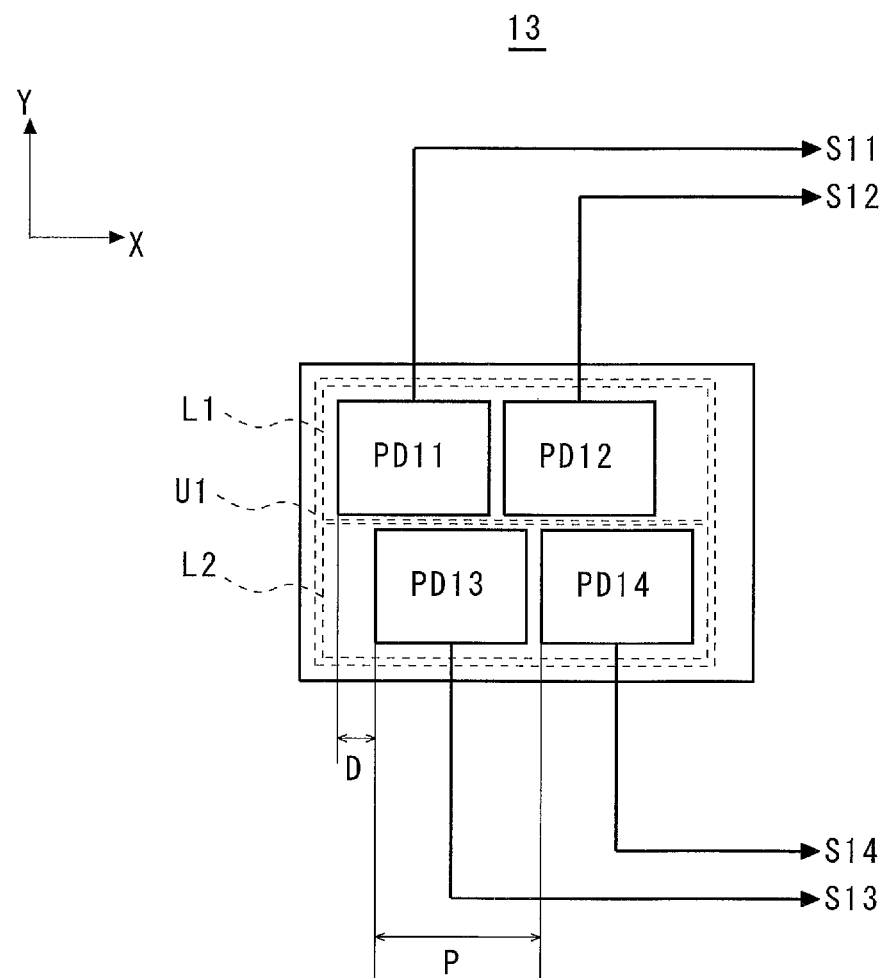
FIG. 14 is a top view schematically showing a configuration of a reference point detection light-receiving unit according to the third exemplary embodiment.

FIG. 14 is a top view schematically showing the configuration of the reference point detection light-receiving unit 13 according to the third exemplary embodiment. The reference point detection light-receiving unit 13 includes a light-receiving element array in which two light-receiving elements are aligned in the X direction that is the reading direction of the reference point detection pattern 22. At least two light-receiving element arrays are aligned in the Y direction that is vertical to the X direction which is the reading direction of the reference point detection pattern 22. These two light-receiving element arrays constitute one unit light-receiving region U1.

As shown in FIG. 14, the reference point detection light-receiving unit 13 includes light-receiving elements PD11 to PD14. The light-receiving elements PD11 and PD12 are aligned at a pitch P in the X direction and constitute one light-receiving element array L1. The light-receiving elements PD13 and PD14 are aligned at the pitch P in the X direction and constitute one light-receiving element array L2. As described above, the light-receiving element array L1 and the light-receiving element array L2 are aligned in the Y direction. Note that an end part of the light-receiving element array L2 in the X direction is disposed with an offset D from an end part of the light-receiving element array L1 in the X direction. Hereinafter, the light-receiving element arrays L1 and L2 are also referred to as a first light-receiving element array and a second light-receiving element array, respectively.

In the reference point detection light-receiving unit 13, at the time of reading the reference point detection pattern 22, the light-receiving element PD11 first starts reading the reference point detection pattern 22, and slightly later, the light-receiving element PD13 starts reading the reference point detection pattern 22. After that, the light-receiving element PD12 starts reading the reference point detection pattern 22, and slightly later, the light-receiving element PD14 starts reading the reference point detection pattern 22. The light-receiving elements PD11 to PD14 output brightness or darkness of the read reference point detection pattern 22 as output signals S11 to S14, respectively.

Figure 15:
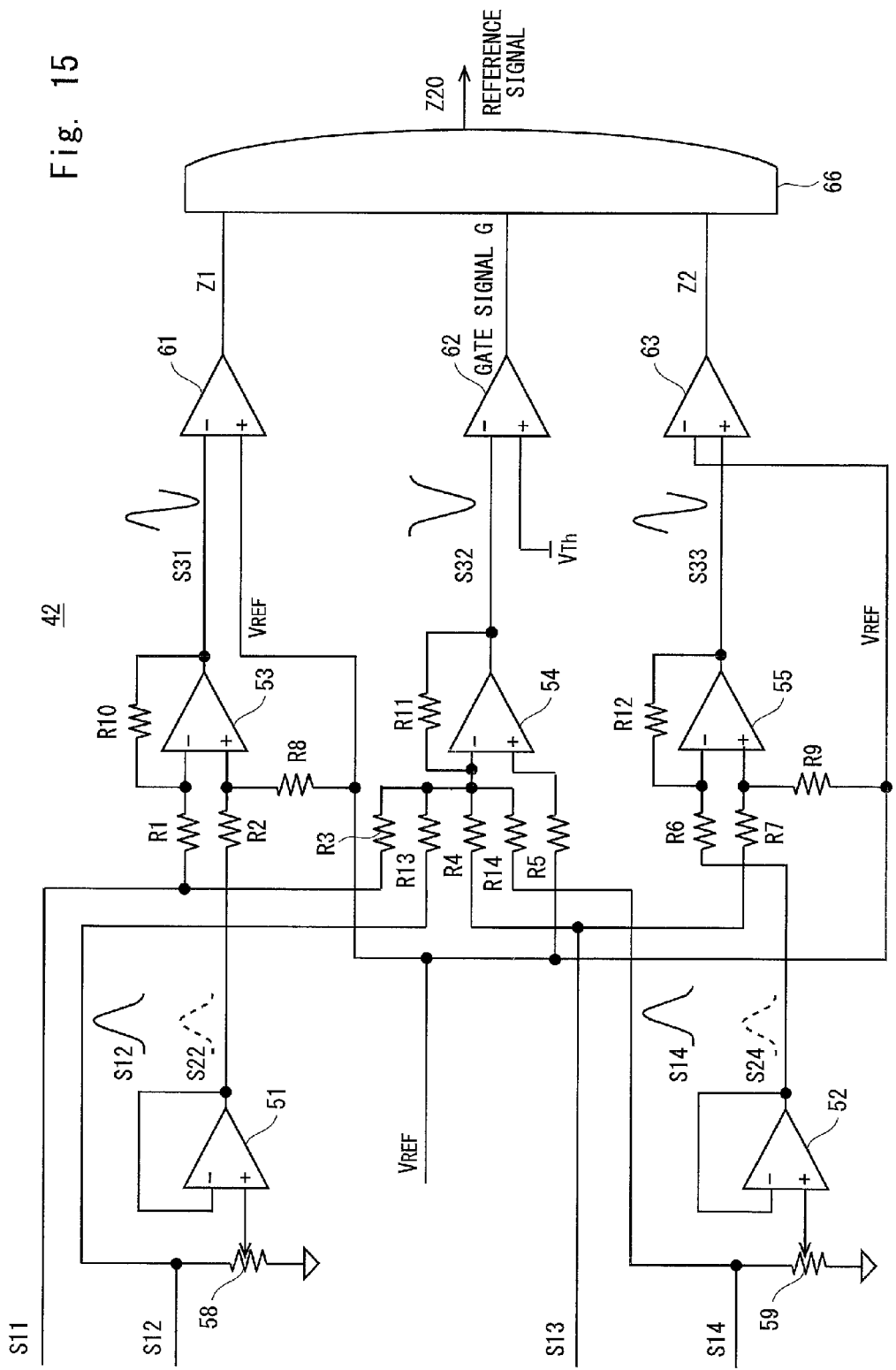
FIG. 15 is a circuit diagram showing examples of circuits of a reference signal processing unit according the third exemplary embodiment.

Like the reference signal generation apparatus 40 according to the first exemplary embodiment, the reference signal generation unit 4 of the reference signal generation apparatus 100 includes the trigger generation unit 41, the reference signal processing unit 42, and the microcomputer 43. FIG. 15 is a circuit diagram showing specific examples of circuits constituting the reference signal processing unit 42. As shown in FIG. 15, the reference signal processing unit 42 includes the amplifiers 51 to 55, the comparators 61 to 63, the AND circuit 66, the digital potentiometers 58 and 59, and the resistors R1 to R12.

The output signals S11 to S14, which are respectively output from the light-receiving elements PD11 to PD14, are input to the reference signal processing unit 42.

The output signal S12 is input to the digital potentiometer 58. A voltage obtained by adjusting the level of the output signal S12 by the digital potentiometer 58 is input to the non-inverting input terminal of the amplifier 51. The inverting input terminal of the amplifier 51 is connected to the output terminal of the amplifier 51. Accordingly, a signal S22 obtained by adjusting the amplitude of the output signal S12 is output from the output terminal of the amplifier 51.

The output signal S14 is input to the digital potentiometer 59. A voltage obtained by adjusting the level of the output signal S14 by the digital potentiometer 59 is input to the non-inverting input terminal of the amplifier 52. The inverting input terminal of the amplifier 52 is connected to the output terminal of the amplifier 52. Accordingly, a signal S24 obtained by adjusting the amplitude of the output signal S14 is output from the output terminal of the amplifier 52.

One end of the resistor R1 receives the output signal S11, and the other end of the resistor R1 is connected to the inverting input terminal of the amplifier 53. One end of the resistor R2 is connected to the output terminal of the amplifier 51. The amplitude-adjusted signal S22 is input to one end of the resistor R2. The other end of the resistor R2 is connected to the non-inverting input terminal of the amplifier 53. One end of the resistor R8 receives the reference voltage $V_{REF}$, and the other end of the resistor R8 is connected to the non-inverting input terminal of the amplifier 53. One end of the resistor R10 is connected to the inverting input terminal of the amplifier 53, and the other end of the resistor R10 is connected to the output terminal of the amplifier 53. The resistors R1, R2, R8, and R10 have the same resistance value. Accordingly, a signal S31 output from the output terminal of the amplifier 53 is expressed as $(S22-S11+V_{REF})$.

One end of the resistor R3 receives the output signal S11, and the other end of the resistor R3 is connected to the inverting input terminal of the amplifier 54. One end of the resistor R4 receives the output signal S13, and the other end of the resistor R4 is connected to the inverting input terminal of the amplifier 54. One end of the resistor R13 receives the output signal S12, and the other end of the resistor R13 is connected to the inverting input terminal of the amplifier 54. One end of the resistor R14 receives the output signal S14, and the other end of the resistor R14 is connected to the inverting input terminal of the amplifier 54. One end of the resistor R5 receives the reference voltage $V_{REF}$, and the other end of the resistor R5 is connected to the non-inverting input terminal of the amplifier 54. One end of the resistor R11 is connected to the inverting input terminal of the amplifier 54, and the other end of the resistor R11 is connected to the output terminal of the amplifier 54. The resistors R3, R4, R5, R11, R13, and R14 have the same resistance value. Accordingly, a signal S32 output from the output terminal of the amplifier 54 is expressed as $(-S11-S12-S13-S14+V_{REF})$.

One end of the resistor R6 receives the signal S24, the amplitude of which has been adjusted, and the other end of the resistor R6 is connected to the inverting input terminal of the amplifier 55. One end of the resistor R7 receives the output signal S13, and the other end of the resistor R7 is connected to the non-inverting input terminal of the amplifier 55. One end of the resistor R9 receives the reference voltage $V_{REF}$, and the other end of the resistor R9 is connected to the non-inverting input terminal of the amplifier 55. One end of the resistor R12 is connected to the inverting input terminal of the amplifier 55, and the other end of the resistor R12 is connected to the output terminal of the amplifier 55. The resistors R6, R7, R9, and R12 have the same resistance value. Accordingly, a signal S33 output from the output terminal of the amplifier 55 is expressed as $(S13-S24+V_{REF})$.

A process similar to that of the first exemplary embodiment is performed on each of the signals S31 to S33, which are output from the output terminals of the amplifiers 53 to 55, respectively, and the reference signal is output from the output terminal of the AND circuit 66. The operations of the comparators 61 to 63 and the AND circuit 66 are similar to those of the first exemplary embodiment, and thus the description thereof is omitted.

Figure 16:
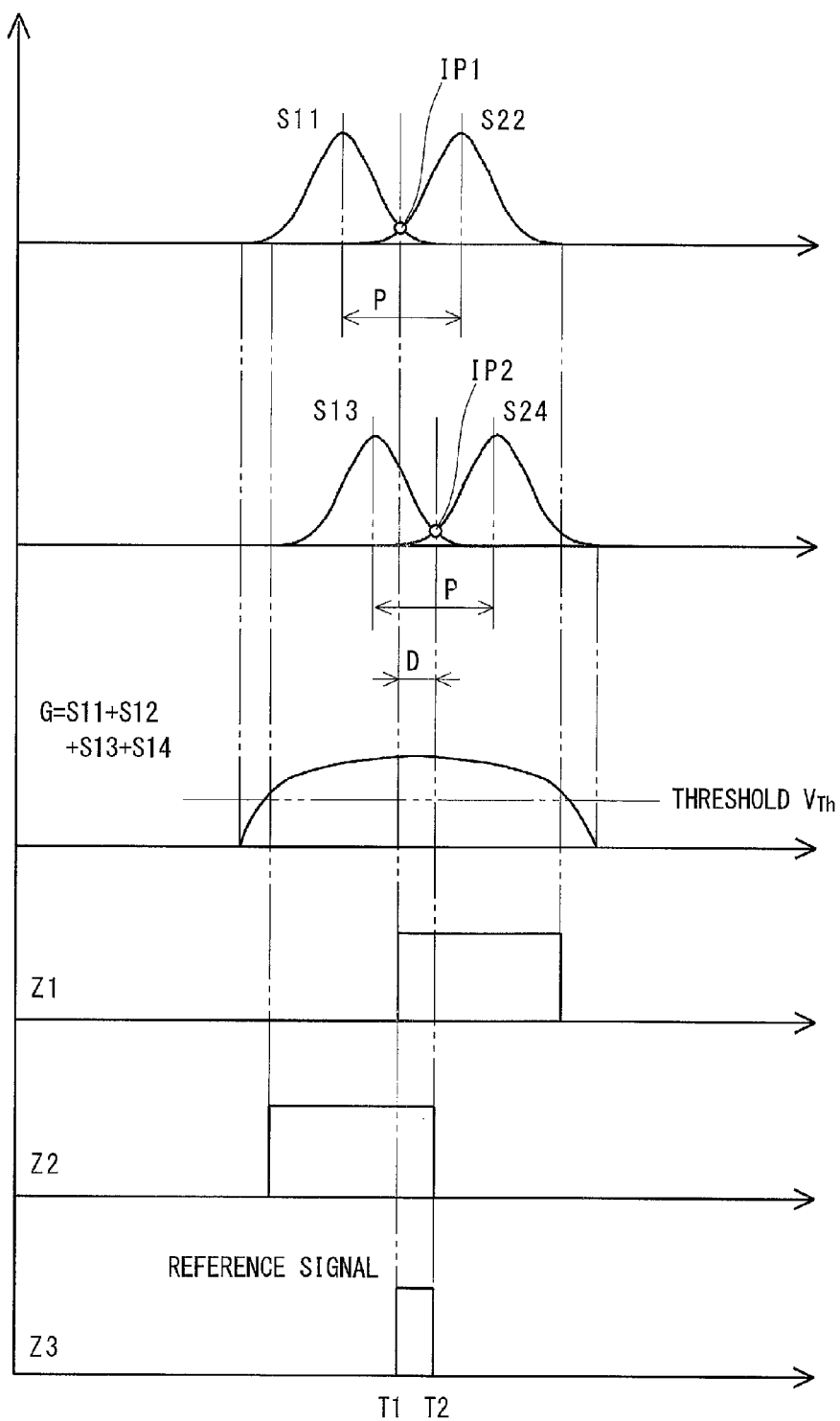
FIG. 16 is a timing chart showing an operation of a reference signal generation apparatus according to the third exemplary embodiment.

Next, the reference signal generation operation of the reference signal generation apparatus 100 will be described. FIG. 16 is a timing chart showing the operation of the reference signal generation apparatus 100. In the light-receiving element array L1, the light-receiving element PD11 reads the reference point detection pattern 22, and after that, the light-receiving element PD12 reads the reference point detection pattern 22. Accordingly, a reading waveform is generated in the output signal S11, and then a reading waveform is generated in the output signal S12. A timing (cross-point IP1) at which the level of the output signal S11 and the level of the signal S22 obtained by adjusting the amplitude of the output signal S12 become equal is defined as the timing T1.

Further, in the light-receiving element array L2, the light-receiving element PD13 reads the reference point detection pattern 22 with a delay of an offset D from the light-receiving element PD11, and after that, with a delay of the offset D from the light-receiving element PD12, the light-receiving element PD14 reads the reference point detection pattern 22. Accordingly, a reading waveform is generated in the output signal S13 with a delay of the offset D from the output signal S11, and after that, with a delay of the offset D from the output signal S12, a reading waveform is generated in the output signal S14. A timing (cross-point IP2) when the level of the output signal S13 and the level of the signal S24 obtained by adjusting the amplitude of the output signal S14 become equal is defined as the timing T2.

At the timing T1, the signal Z1 becomes HIGH, and at the time when the reading waveform of the output signal S12 falls, the signal Z1 becomes LOW. At the time when a reading waveform is generated in the output signal S13, the signal Z2 becomes HIGH, and the signal Z2 becomes LOW at the timing T2.

The reference signal generation unit 4 generates the reference signal by taking a logical AND of the signal Z1 and the signal Z2 when the gate signal G (S11+S12+S13+S14) exceeds the threshold voltage $V_{Th}$ and is active. The timing T1 corresponds to the starting point of the reference signal, and the timing T2 corresponds to the end point of the reference signal.

As described above, in this configuration, the two light-receiving element arrays L1 and L2 generate the two cross-points IP1 and IP2, respectively, which differ in timing. Then, a reference pulse signal Z3 which is sandwiched between the cross-point IP1 and the cross-point IP2 is generated. In this configuration, the timing of the cross-point IP1 is determined by the arrangement of the light-receiving elements PD11 and PD12 and the magnification of the amplitude to be adjusted for the output signal S12. Furthermore, in this configuration, the timing of the cross-point IP2 is determined by the arrangement of the light-receiving elements PD13 and PD14 and the magnification of the amplitude to be adjusted for the output signal S14. When the magnification of the amplitude to be adjusted for the output signal S12 is equal to that for the output signal S14, a difference between the timing of the cross-point IP1 and the timing of the cross-point IP2 is a constant value determined by the offset D. Thus, according to this configuration, it is possible to maintain the pulse width of the reference pulse signal Z3, which is t reference signal, to be constant.

Further, in this configuration, the offset D can be determined only by the arrangement of the light-receiving element arrays. Accordingly, the offset D is not subjected to a restriction of a minimum feature size such as a manufacturing process of the light-receiving unit. Consequently, the value of the offset D can be determined freely according to a desired value of the pulse width of the reference pulse signal Z3.

Furthermore, in this configuration, it is possible to obtain the reference signal with a constant width without requiring special work on the side of the reference point detection pattern 22. Thus, in order to read the reference point detection pattern 22, it is not necessary to insert an optical system or the like between the reference point detection pattern 22 and the light-receiving unit 7, thereby achieving a simple configuration.

Fourth Exemplary Embodiment

Figure 17:
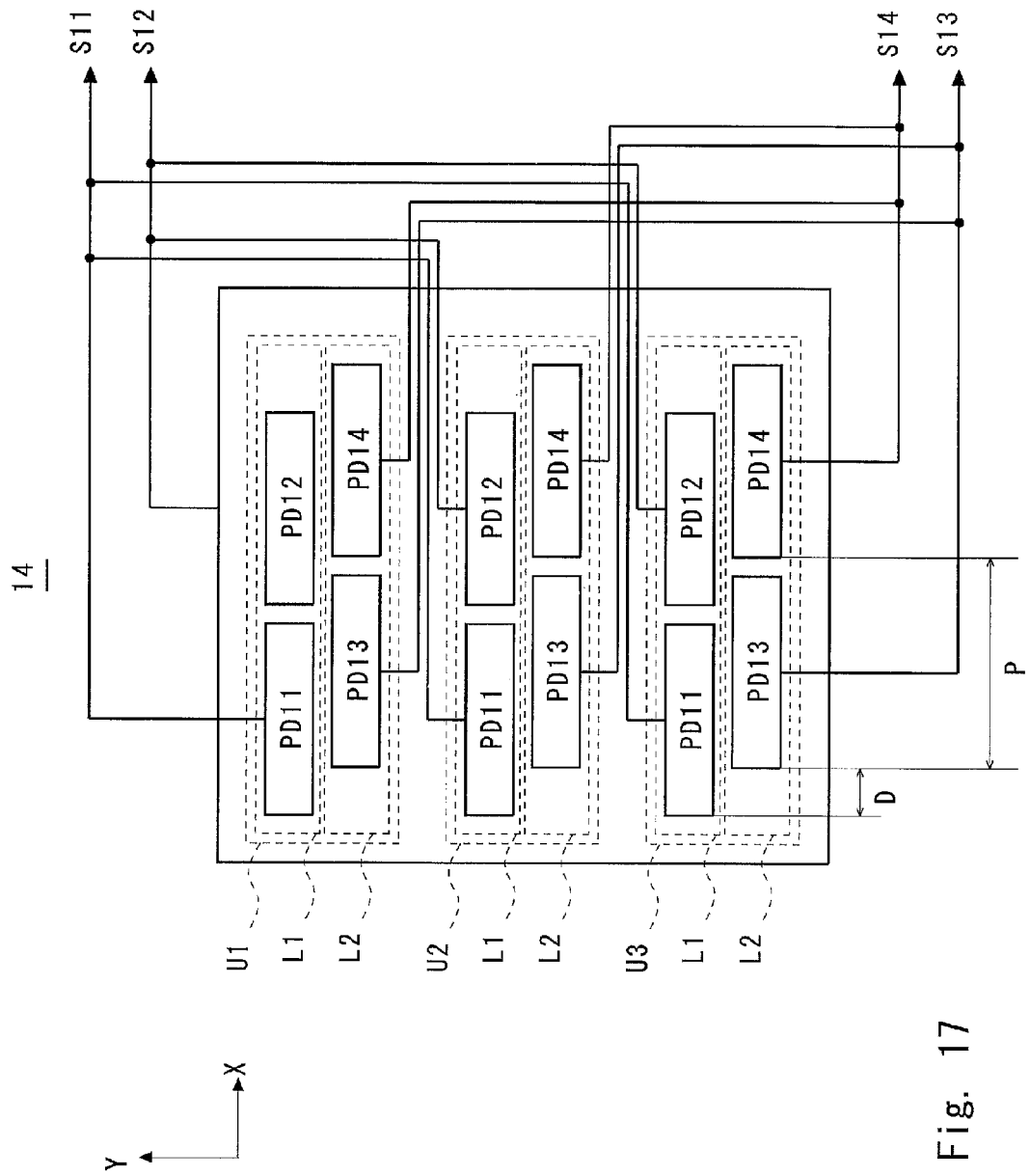
FIG. 17 is a top view schematically showing a configuration of a reference point detection light-receiving unit according to a fourth exemplary embodiment.

Next, a reference signal generation apparatus 200 according to a fourth exemplary embodiment will be described. The reference signal generation apparatus 200 is a modified example of the reference signal generation apparatus 100 and is used to determine a reference position of an incremental optical encoder that is used to determine a position of a measurement device or the like. The reference signal generation apparatus 200 has a configuration in which the reference point detection light-receiving unit 13 of the reference signal generation apparatus 100 is replaced by a reference point detection light-receiving unit 14. FIG. 17 is a top view schematically showing the configuration of the reference point detection light-receiving unit 14 according to the fourth exemplary embodiment.

The reference point detection light-receiving unit 14 includes unit light-receiving regions U1 to U3. The unit light-receiving regions U1 to U3 are aligned in the Y direction. The unit light-receiving region U1 has a configuration similar to that of the third exemplary embodiment, and the unit light-receiving regions U2 and U3 have a configuration similar to that of the unit light-receiving region U1, and thus the description thereof is omitted. Since other configurations and the reference signal generation operation of the reference signal generation apparatus 200 are similar to those of the reference signal generation apparatus 100, the description thereof is omitted.

In the reference signal generation apparatus 200, a signal obtained by adding output signals from the light-receiving elements PD11 of the unit light-receiving regions U1 to U3 is referred to as the output signal S11; a signal obtained by adding output signals from the light-receiving elements PD12 of the unit light-receiving regions U1 to U3 is referred to as the output signal S12; a signal obtained by adding output signals from the light-receiving elements PD13 of the unit light-receiving regions U1 to U3 is referred to as the output signal S13; and a signal obtained by adding output signals from the light-receiving elements PD14 of the unit light-receiving regions U1 to U3 is referred to as the output signal S14. These signals allow the reference signal generation apparatus 200 to generate a reference signal in the same manner as that in the reference signal generation apparatus 100 according to the third exemplary embodiment.

Figure 18:
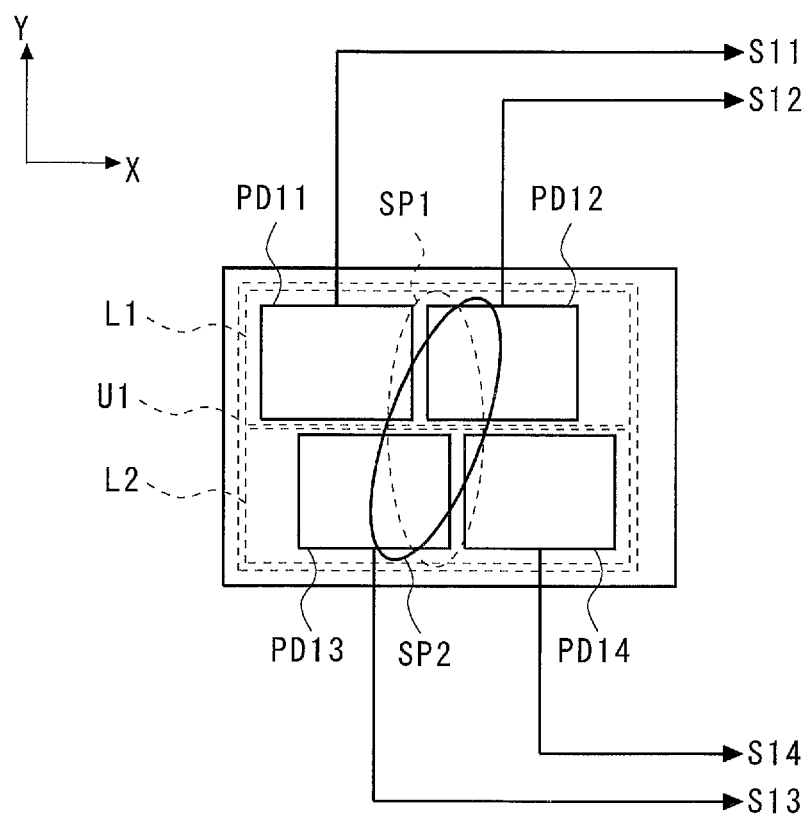
FIG. 18 is a top view showing a shape of a light spot irradiated on the reference point detection light-receiving unit according to the third exemplary embodiment.

In the reference signal generation apparatus, a light spot irradiated on the light-receiving unit may rotate at the time of reading the reference point detection pattern 22 due to a manufacturing error or a disturbance and the like during operation. FIG. 18 is a top view showing the shape of the spot light that is irradiated on the unit light-receiving region U1 of the reference point detection light-receiving unit 13 according to the third exemplary embodiment. When the light spot does not rotate, the light spot will have a shape in which a long axis is along the Y direction, for example, like a spot SP1. Meanwhile, when the light spot rotates, the light spot will have a shape in which a long axis rotates clockwise, for example, like a spot SP2.

Figure 19:
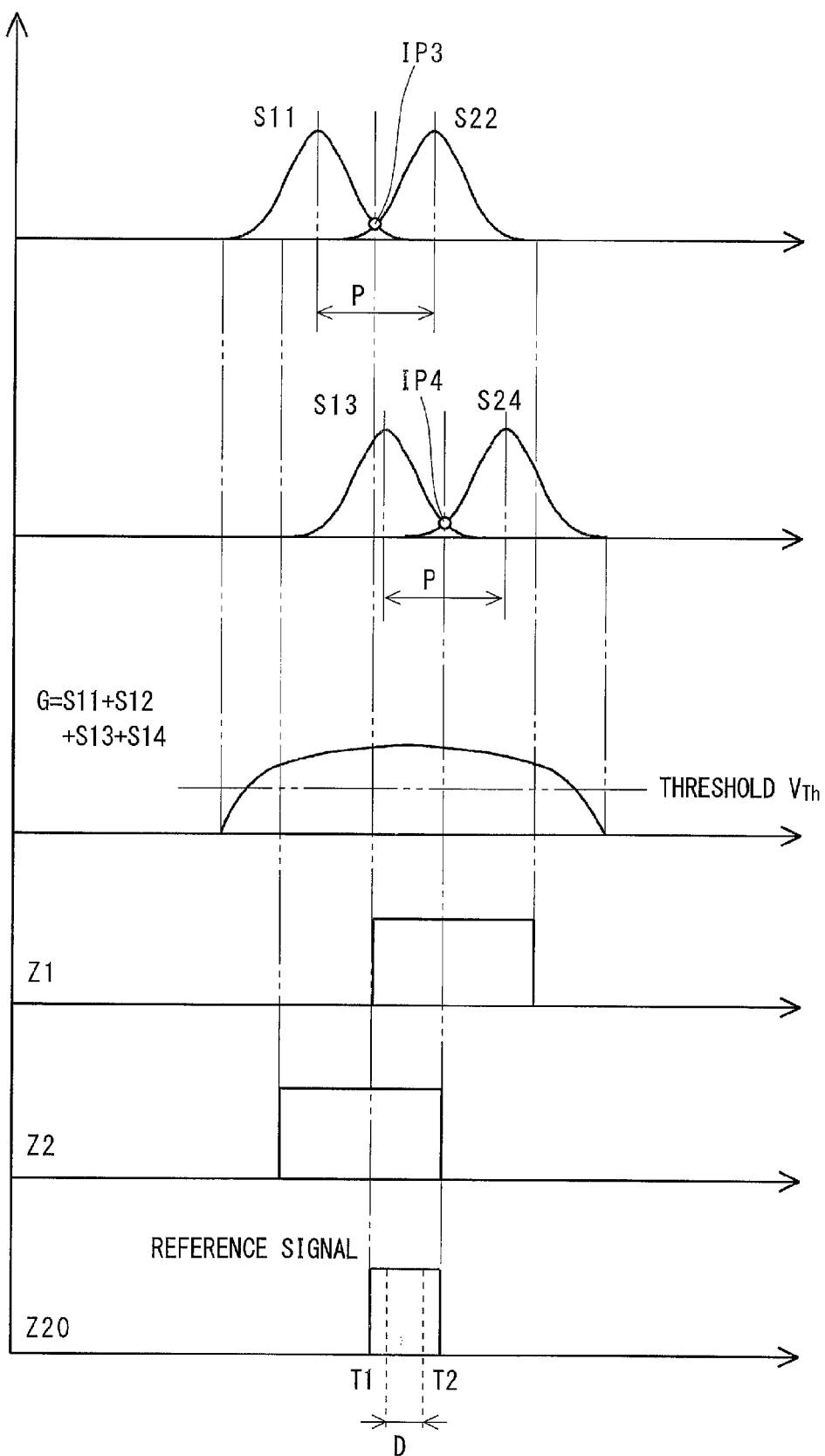
FIG. 19 is a timing chart showing a signal in the reference signal processing unit when spots SP1 and SP2 are irradiated on the reference point detection light-receiving unit according to the third exemplary embodiment.

FIG. 19 is a timing chart showing a signal in the reference point detection light-receiving unit 13 when the spots SP1 and SP2 are irradiated. When the light spot moves from left to right of the drawing, the light is irradiated on the light-receiving elements PD11 and PD12 by the spot SP2 faster than by the spot SP1, and the light is irradiated on the light-receiving elements PD13 and PD14 by the spot SP2 slower than by the spot SP1. Therefore, a cross-point IP3 when the spot SP2 is irradiated will have a timing faster than that of the cross-point IP1 when the spot SP1 is irradiated. Further, a cross-point IP4 when the spot SP2 is irradiated will have a timing slower than that of the cross-point IP2 when the spot SP1 is irradiated. Accordingly, a reference pulse signal Z20 that is generated based on the spot SP2 will have a pulse width wider than that of the reference pulse signal Z3 that is generated based on the spot SP1.

Figure 20:
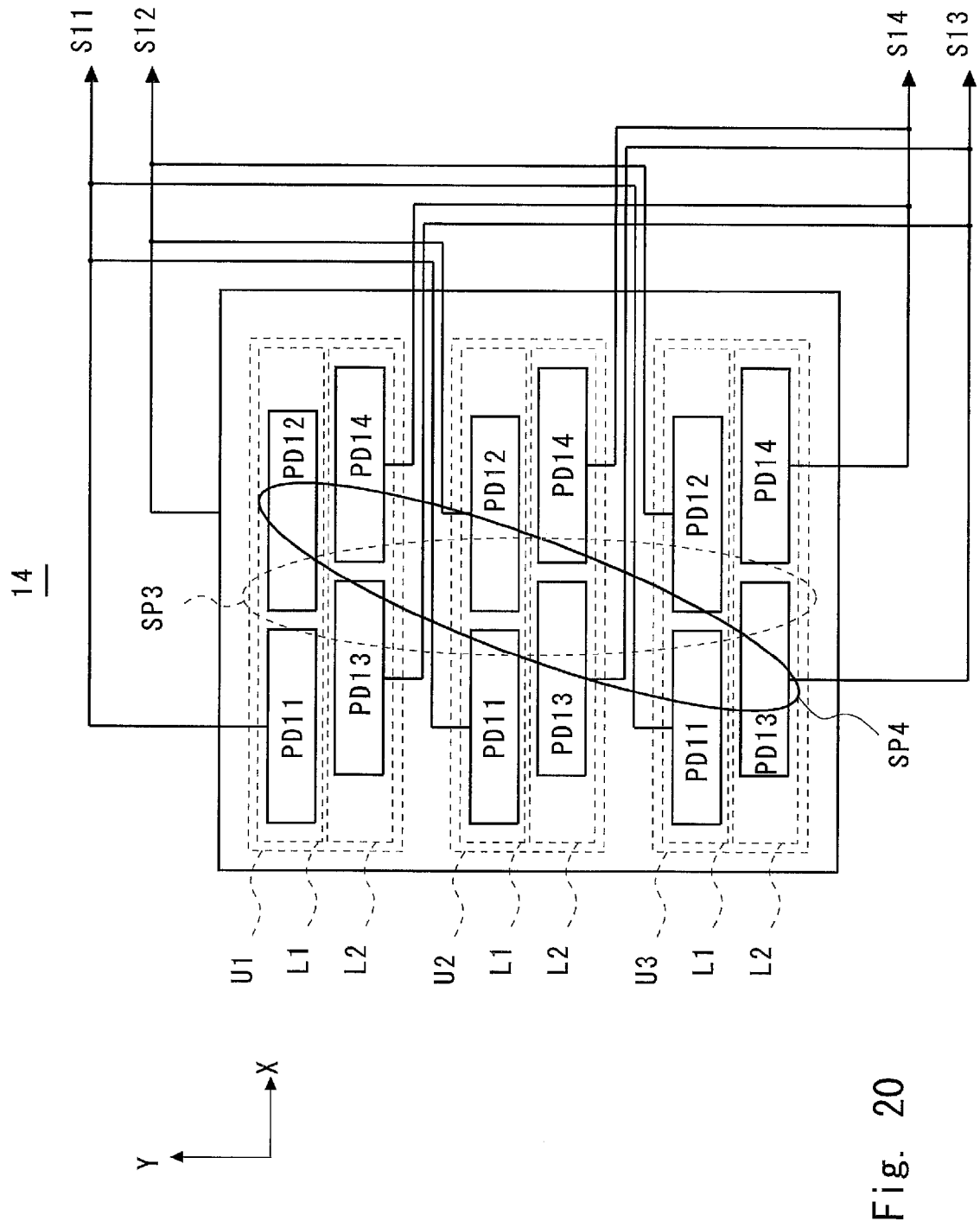
FIG. 20 is a top view showing a shape of a light spot irradiated on a reference point detection light-receiving unit according to a fourth exemplary embodiment.
Figure 21:
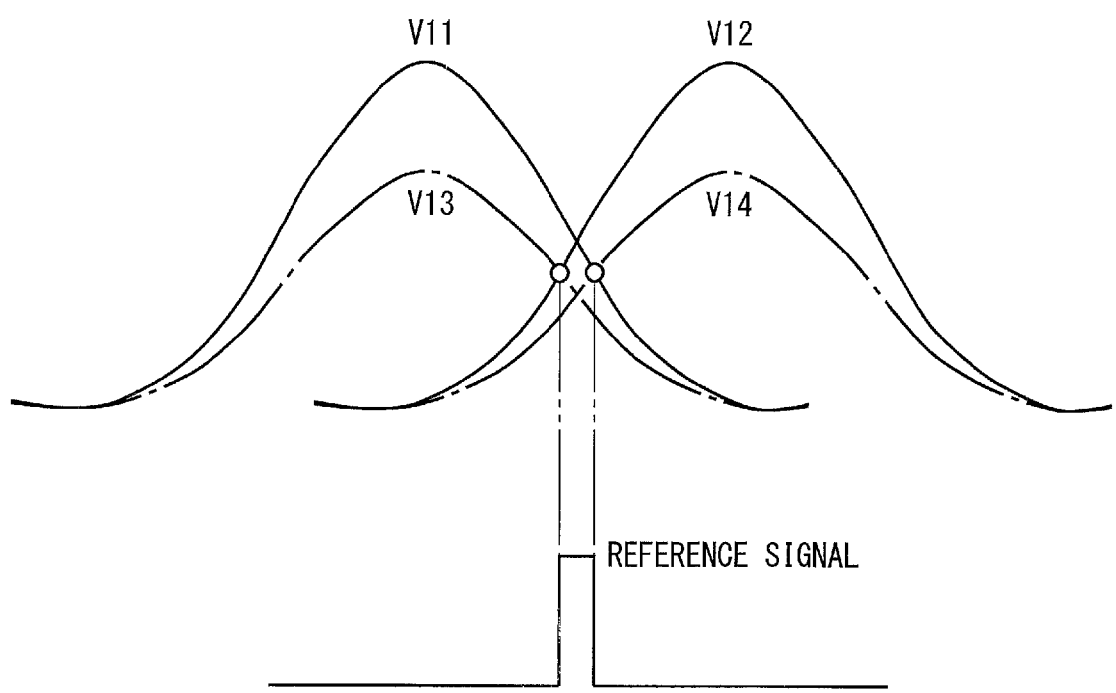
FIG. 21 is a diagram for explaining a reference signal generation method of the related art.

However, in this exemplary embodiment, since a plurality of unit light-receiving regions are provided in the Y direction, it is possible to reduce a fluctuation in the width of the reference pulse signal by rotation of the light spot. FIG. 20 is a top view showing a shape of a light spot irradiated on the reference point detection light-receiving unit 14. When the light spot does not rotate, the light spot will have a shape in which a long axis is along the Y direction, for example, like a spot SP3. Meanwhile, when the light spot rotates, the light spot will have a shape in which a long axis rotates clockwise, for example, like a spot SP4.

In the reference point detection light-receiving unit 14, the unit light-receiving regions are aligned in a long-axis direction (Y direction) of the light spot. Accordingly, even when the light spot rotates like the spot SP4, the light-receiving element outputs a signal at an early timing in the upper part of the spot SP4 in the Y direction, while the light-receiving element outputs a timing at a delayed timing in the lower part of the spot SP4 in the Y direction. Therefore, the output signals S11 to S14, which are output respectively from the unit light-receiving regions of the upper part of the spot SP4 and from the unit light-receiving regions of the lower part of the spot SP4, are synthesized, and a difference between the timings of the cross-point IP3 and the cross-point IP4 is cancelled out. Consequently, according to this configuration, it is possible to maintain a width of a reference signal even when a light spot that is irradiated on the light-receiving unit rotates (yaws).

Although an example in which there are three unit light-receiving regions has been explained above, this is merely an example. The number of the unit light-receiving regions may be any plural number other than three in this exemplary embodiment.

Note that the present invention is not limited to the above exemplary embodiments, and modifications can be made as appropriate without departing from the scope of the present invention. For example, the optical encoder of the present invention is not limited to a transmissive encoder, but can also be applied to a reflective encoder. Furthermore, the optical encoder of the present invention is not limited to a linear encoder, but can also be applied to a rotary encoder.

Although the above exemplary embodiments illustrate a case where the timing T1 and the timing T2 match when the phase of the main signal is 225°, this case is merely an example. The phase of the main signal at the timing T1 and the timing T2 may be any phase other than 225°.

In the above exemplary embodiments, the trigger signal is generated by using the main signal as a reference. However, any signal other than the main signal may be used as a reference.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A reference signal generation method for an optical encoder,
the optical encoder comprising:
a scale including a reference point detection pattern and a displacement detection pattern; and
a detection head including:
a light source that emits light to the scale;
a first light-receiving element and a second light-receiving element which receive light emitted from the reference point detection pattern when light is irradiated on the reference point detection pattern by the light source, the first light-receiving element and the second light-receiving element being arranged in parallel in a length measuring direction of the scale; and
a main signal detection unit that detects a main signal from light transmitted through the displacement detection pattern,
the reference signal generation method comprising:
generating a first output signal based on an amount of light received by the first light-receiving element when the detection head is moved along the scale;
generating a second output signal based on an amount of light received by the second light-receiving element when the detection head is moved along the scale;
performing a first amplitude adjustment to adjust an amplitude of one of the first output signal and the second output signal in such a manner that a level of the first output signal and a level of the second output signal become equal when a phase of the main signal is a first reference phase;
performing a second amplitude adjustment to adjust an amplitude of one of the first output signal and the second output signal in such a manner that the level of the first output signal and the level of the second output signal become equal when the phase of the main signal is a second reference phase; and
outputting a reference signal that starts at a timing when the level of the second output signal and the level of the first output signal subjected to the first amplitude adjustment become equal and ends at a timing when the level of the second output signal and the level of the first output signal subjected to the second amplitude adjustment become equal.

2. The reference signal generation method according to claim 1, wherein
in the first amplitude adjustment, a third output signal is generated by adjusting an amplitude of the first output signal in such a manner that the level of the first output signal and the level of the second output signal become equal when the phase of the main signal is the first reference phase,
in the second amplitude adjustment, a fourth output signal is generated by adjusting an amplitude of the second output signal in such a manner that the level of the second output signal and the level of the first output signal become equal when the phase of the main signal is the second reference phase, and the reference signal that starts at a timing when the level of the second output signal and the level of the third output signal become equal and ends at a timing when the level of the first output signal and the level of the fourth output signal become equal is output.

3. The reference signal generation method according to claim 1, wherein the optical encoder comprises a plurality of pairs of the first and second light-receiving elements aligned in the length measuring direction of the scale, the plurality of pairs of the first and second light-receiving elements respectively corresponding to a plurality of reference point detection patterns aligned in the length measuring direction of the scale, and the first output signal is generated by adding signals output from the plurality of first light-receiving elements, and the second output signal is generated by adding signals output from the plurality of second light-receiving elements.

4. The reference signal generation method according to claim 1, wherein a first light-receiving element array including the first and second light-receiving elements is provided, a second light-receiving element array including the first and second light-receiving elements is provided, the first amplitude adjustment is performed on the first output signal output from the first light-receiving element of the first light-receiving element array, and on the second output signal output from the second light-receiving element of the first light-receiving element array, and the second amplitude adjustment is performed on the first output signal output from the first light-receiving element of the second light-receiving element array, and on the second output signal output from the second light-receiving element of the second light-receiving element.

5. The reference signal generation method according to claim 4, wherein the first output signal output from the first light-receiving element of the second light-receiving element array is delayed by a predetermined time with respect to the first output signal output from the first light-receiving element of the first light-receiving element array, and the second output signal output from the second light-receiving element of the second light-receiving element array is delayed by the predetermined time with respect to the second output signal output from the second light-receiving element of the first light-receiving element array.

6. The reference signal generation method according to claim 5, wherein the first light-receiving element of the second light-receiving element array and the first light-receiving element of the first light-receiving element array are arranged with an offset in the length measuring direction of the scale, and the second light-receiving element of the second light-receiving element array and the second light-receiving element of the first light-receiving element array are arranged with an offset in the length measuring direction of the scale.

7. The reference signal generation method according to claim 4, wherein a plurality of light-receiving regions each including the first and second light-receiving element arrays are provided, the plurality of light-receiving regions being aligned in a direction orthogonal to the length measuring direction of the scale, the first amplitude adjustment is performed on a signal obtained by adding the first output signals output from the first light-receiving element arrays of the plurality of light-receiving regions, and on a signal obtained by adding the second output signals output from the first light-receiving element arrays of the plurality of light-receiving regions, and the second amplitude adjustment is performed on a signal obtained by adding the first output signals output from the second light-receiving element arrays of the plurality of light-receiving regions, and on a signal obtained by adding the second output signals output from the second light-receiving element arrays of the plurality of light-receiving regions.

8. The reference signal generation method according to claim 7, wherein the third output signal is generated by providing a gain to the first output signal, and the fourth output signal is generated by providing a gain to the second output signal.

9. The reference signal generation method according to claim 7, wherein the third output signal is generated by reducing the first output signal, and the fourth output signal is generated by reducing the second output signal.

10. The reference signal generation method according to claim 7, further comprising:

moving the detection head along the scale to detect a first timing when a level of the second output signal and a level of the third output signal become equal, and a second timing when a level of the first output signal and a level of the fourth output signal become equal;

correcting the third output signal by multiplying the third output signal by a ratio of a value of the second output signal to a value of the third output signal when the phase of the main signal is the first reference phase;

correcting the fourth output signal by multiplying the fourth output signal by a ratio of a value of the first output signal to a value of the fourth output signal when the phase of the main signal is the second reference phase;

calculating a corrected first timing when the level of the second output signal and the level of the corrected third output signal become equal;

calculating a corrected second timing when the level of the first output signal and the level of the corrected fourth output signal become equal; and outputting a reference output that starts at the corrected first timing and ends at the corrected second timing.

11. An optical encoder comprising:

a scale including a reference point detection pattern and a displacement detection pattern;

a detection head including:

a light source that emits light to the scale;

a first light-receiving element and a second light-receiving element which receive light emitted from the reference point detection pattern when light is irradiated on the reference point detection pattern by the light source, the first light-receiving element and the second light-receiving element being arranged in parallel in a length measuring direction of the scale; and a main signal detection unit that detects a main signal from light transmitted through the displacement detection pattern; and a reference signal generation unit that generates a reference signal based on output signals from the first light-receiving element and the second light-receiving element, wherein the reference signal generation unit is configured to:

generate a first output signal based on an amount of light received by the first light-receiving element when the detection head is moved along the scale;

generate a second output signal based on an amount of light received by the second light-receiving element when the detection head is moved along the scale;

perform a first amplitude adjustment to adjust an amplitude of one of the first output signal and the second output signal in such a manner that a level of the first output signal and a level of the second output signal become equal when a phase of the main signal is a first reference phase;

perform a second amplitude adjustment to adjust an amplitude of one of the first output signal and the second output signal in such a manner that the level of the first output signal and the level of the second output signal become equal when the phase of the main signal is a second reference phase; and output a reference signal that starts at a timing when the level of the second output signal and the level of the first output signal subjected to the first amplitude adjustment become equal and ends at a timing when the level of the second output signal and the level of the first output signal subjected to the second amplitude adjustment become equal.

\* \* \* \* \*